(12) United States Patent
Hurst et al.

(10) Patent No.: US 11,073,144 B1
(45) Date of Patent: Jul. 27, 2021

(54) PUMP VALVE ASSEMBLY

(71) Applicant: Halliburton Energy Services, Inc., Houston, TX (US)

(72) Inventors: Justin Lee Hurst, Healdton, OK (US); David Mark Stribling, Duncan, OK (US); James Alan Olis, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/791,479

(22) Filed: Feb. 14, 2020

(51) Int. Cl.
| | |
|---|---|
| *E21B 34/00* | (2006.01) |
| *E21B 34/02* | (2006.01) |
| *F04B 37/12* | (2006.01) |
| *F04B 39/10* | (2006.01) |
| *E21B 33/13* | (2006.01) |
| *F16K 15/06* | (2006.01) |
| *E21B 43/26* | (2006.01) |

(Continued)

(52) U.S. Cl.
CPC .............. *F04B 37/12* (2013.01); *E21B 34/00* (2013.01); *E21B 34/02* (2013.01); *F04B 39/10* (2013.01); *E21B 33/13* (2013.01); *E21B 43/04* (2013.01); *E21B 43/114* (2013.01); *E21B 43/26* (2013.01); *F16K 15/063* (2013.01)

(58) Field of Classification Search
CPC .................................. E21B 34/00; E21B 34/02
See application file for complete search history.

(56) References Cited

U.S. PATENT DOCUMENTS

| | | |
|---|---|---|
| 1,662,725 A | 3/1928 | Toney, Jr. |
| 2,673,519 A | 3/1954 | Halliburton |
| 2,678,006 A | 5/1954 | Gray |
| | (Continued) | |

FOREIGN PATENT DOCUMENTS

| | | |
|---|---|---|
| CH | 257522 A | 10/1948 |
| DE | 19808724 A1 | 9/1998 |
| | (Continued) | |

OTHER PUBLICATIONS

Foreign Communication from Related Application—International Search Report and Written Opinion of the International Searching Authority, International Application No. PCT/US2020/022043, dated Jul. 3, 2020, 13 pages.

(Continued)

*Primary Examiner* — Catherine Loikith
(74) *Attorney, Agent, or Firm* — Conley Rose, P.C.; Rodney B. Carroll

(57) ABSTRACT

A valve assembly having a valve body, a hardened insert, a sealing insert, and a carrier. The hardened insert is cylindrical and comprises a primary sealing surface. The sealing insert is cylindrical and comprises an initial sealing surface. The carrier has an inside surface. The hardened insert and the sealing insert are coupled to the carrier. In a closed configuration of the valve assembly, the valve body contacts the primary sealing surface of the hardened insert and the initial sealing surface of the sealing insert to prevent fluid flow through the valve assembly, and in an open configuration, the valve body is separated from the primary sealing surface of the hardened insert and the initial sealing surface of the sealing insert to allow fluid flow through the valve assembly.

20 Claims, 14 Drawing Sheets

(51) Int. Cl.
*E21B 43/04* (2006.01)
*E21B 43/114* (2006.01)

(56) References Cited

U.S. PATENT DOCUMENTS

| | | | |
|---|---|---|---|
| 3,005,412 | A | 10/1961 | Camp |
| 3,229,640 | A | 1/1966 | Williams |
| 3,301,197 | A | 1/1967 | Dodson et al. |
| 3,380,247 | A | 4/1968 | Colmerauer |
| 3,887,305 | A | 6/1975 | Ito |
| 4,478,561 | A | 10/1984 | Elliston |
| 4,770,206 | A | 9/1988 | Sjoberg |
| 5,061,159 | A | 10/1991 | Pryor |
| 8,360,751 | B2 | 1/2013 | Duncan |
| 8,590,614 | B2 | 11/2013 | Surjaatmadja et al. |
| 9,435,454 | B2 | 9/2016 | Blume |
| 2005/0126638 | A1 | 6/2005 | Gilbert |
| 2006/0249703 | A1 | 11/2006 | Gilbert et al. |
| 2009/0246051 | A1 | 10/2009 | Kim |
| 2012/0279721 | A1 | 11/2012 | Surjaatmadja et al. |
| 2014/0127036 | A1 | 5/2014 | Buckley et al. |
| 2014/0127058 | A1 | 5/2014 | Buckley et al. |
| 2014/0127062 | A1 | 5/2014 | Buckley et al. |
| 2014/0322050 | A1 | 10/2014 | Marette et al. |
| 2014/0356201 | A1 | 12/2014 | Blume |
| 2016/0131131 | A1 | 5/2016 | Weaver et al. |
| 2016/0281699 | A1 | 9/2016 | Gnessin et al. |
| 2016/0319805 | A1 | 11/2016 | Dille |
| 2018/0073653 | A1 | 3/2018 | Bayyouk et al. |
| 2018/0313456 | A1 | 11/2018 | Bayyouk et al. |
| 2019/0011051 | A1* | 1/2019 | Yeung ............... F04B 47/04 |
| 2019/0040966 | A1 | 2/2019 | Myers et al. |
| 2019/0063427 | A1 | 2/2019 | Nowell et al. |
| 2019/0120389 | A1 | 4/2019 | Foster et al. |
| 2019/0145391 | A1 | 5/2019 | Davids |
| 2019/0376508 | A1 | 12/2019 | Wagner et al. |
| 2020/0347706 | A1 | 11/2020 | Nowell et al. |

FOREIGN PATENT DOCUMENTS

| | | |
|---|---|---|
| EP | 0580196 A1 | 1/1994 |
| EP | 1103722 A2 | 5/2001 |
| EP | 2383470 A1 | 11/2011 |
| GB | 120622 A | 11/1918 |
| GB | 450645 A | 7/1936 |
| GB | 672173 A | 5/1952 |
| GB | 1226014 A | 3/1971 |
| GB | 1262826 A | 2/1972 |
| JP | 63001012 Y2 | 1/1988 |
| JP | 2002037217 A | 2/2002 |
| JP | 2004257283 A | 9/2004 |
| JP | 4121804 B2 | 7/2008 |
| JP | 2009131747 A | 6/2009 |
| JP | 5107651 B2 | 12/2012 |
| JP | 2020040010 A | 3/2020 |
| WO | 2019191276 A1 | 10/2019 |

OTHER PUBLICATIONS

Foreign Communication from Related Application—International Search Report and Written Opinion of the International Searching Authority, International Application No. PCT/US2020/018718, dated Oct. 30, 2020, 14 pages.

Foreign Communication from Related Application—International Search Report and Written Opinion of the International Searching Authority, International Application No. PCT/US2020/018719, dated Nov. 3, 2020, 13 pages.

Surjaatmadja, Jim Basuki et al., Fling Receipt, Specification and Drawings for U.S. Appl. No. 16/436,356, filed Jun. 10, 2019, titled "Multi-Material Frac Valve Poppet," 78 pages.

Hurst, Justin Lee et al., Filing Receipt, Specification and Drawings for U.S. Appl. No. 16/791,474, filed Feb. 14, 2020, titled "Plunger or Piston with Hardened Insert," 86 pages.

Hurst, Justin Lee et al., Filing Receipt, Specification and Drawings for U.S. Appl. No. 16/411,910, filed May 14, 2019, titled "Valve Assembly for a Fluid End with Limited Access," 75 pages.

Hurst, Justin Lee et al., Filing Receipt, Specification and Drawings for U.S. Appl. No. 16/411,898, filed May 14, 2019, titled "Pump Valve Seat with Supplemental Retention," 72 pages.

Kiani, Mahdi et al., "Numerical Modeling and Analytical Investigation of Autofrettage Process on the Fluid End Module of Fracture Pumps," Journal of Pressure Vessel Technology, Aug. 2018, pp. 0414031-0414037, vol. 140, ASME.

"Pump Catalog," Cat Pumps, Inc., 2014, 24 pages.

Furuta, Katsunori et al., "Study of the In-Line Pump System for Diesel Engines to Meet Future Emission Regulations," SAE International Congress and Exposition, Feb. 1998, pp. 125-136, Society of Automotive Engineers, Inc.

"550 Series: High Pressure, High Flow Water Jetting," Gardner Denver Water Jetting Systems, Inc., 2009, 4 pages.

Houghton, J.E. et al., "Improved Pump Run Time Using Snow Auto-Rotating Plunger (SARP) Pump," SPE Western Regional Meeting, May 1998, SPE46217, 6 pages, Society of Petroleum Engineers, Inc.

"Improved Double Acting Pump," Scientific American, 1867, pp. 248, vol. 17, No. 16, American Periodicals.

Langewis, Jr., C. et al., "Practical Hydraulics of Positive Displacement Pumps for High-Pressure Waterflood Installations," Journal of Petroleum Technology, Feb. 1971, pp. 173-179, SPE-AIME/Continental Oil Co.

Petzold, Martin et al., "Visualization and Analysis of the Multiphase Flow in an Electromagnetically Driven Dosing Jump," ASME/BATH Symposium on Fluid Power & Motion Control, Oct. 2013, FPMC2013-4433, 6 pages, ASME.

Romer, M. C. et al., "Field Trial of a Novel Self-Reciprocating Hydraulic Pump for Deliquification," SPE Production & Operations, 2017, 12 pages, Society of Petroleum Engineers.

* cited by examiner

PUMP VALVE ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates generally to a method and apparatus for supplying pressurized fluids. More particularly, the present disclosure relates to methods and reciprocating devices for pumping fluids into a wellbore.

BACKGROUND

High-pressure pumps having reciprocating elements such as plungers or pistons are commonly employed in oil and gas production fields for operations such as drilling and well servicing. For instance, one or more reciprocating pumps may be employed to pump fluids into a wellbore in conjunction with activities including fracturing, acidizing, remediation, cementing, and other stimulation or servicing activities. Due to the harsh conditions associated with such activities, many considerations are generally taken into account when designing a pump for use in oil and gas operations. One design consideration may concern lifetime and reliability of pump fluid end components, as reciprocating pumps used in wellbore operations, for example, often encounter high cyclical pressures and various other conditions that can render pump components susceptible to wear and result in a need for servicing and maintenance of the pump.

Accordingly, it is desirable to provide a pump fluid end that enhances a life of components therein, such as a valve assembly, whereby maintenance can be minimized and/or simplified.

BRIEF SUMMARY OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a reciprocating apparatus for pumping pressurized fluid. In embodiments, the reciprocating apparatus comprises a pump fluid end containing a valve assembly. The valve assembly of this disclosure comprises: a valve body, a hardened insert, a sealing insert, and a carrier. The hardened insert is cylindrical and comprises a primary sealing surface. The sealing insert is cylindrical and comprises an initial sealing surface. The carrier has an inside surface. The hardened insert and the sealing insert are coupled to the carrier, such that, in a closed configuration of the valve assembly, the valve body contacts the primary sealing surface of the hardened insert and the initial sealing surface of the sealing insert to prevent fluid flow through the valve assembly, and such that, in an open configuration, the valve body is separated from the primary sealing surface of the hardened insert and the initial sealing surface of the sealing insert to allow fluid flow through the valve assembly. The use of the term "hardened" with reference to the "hardened insert" indicates that the "hardened insert" has a hardness greater than that of the sealing insert and carrier. The "hardened insert" can also be referred to herein as a "mini valve seat". In embodiments, the reciprocating apparatus is a high-pressure pump configured to operate at a pressure greater than or equal to about 3,000 psi and/or in a well servicing operation and environment. As detailed further hereinbelow, utilization of a valve assembly of this disclosure as a suction valve assembly and/or utilization of a valve assembly of this disclosure as a discharge valve assembly of a pump can increase a life and/or reduce a cost relative to a conventional valve assembly, thus reducing maintenance cost and downtime for maintenance of the pump.

Figure 1:
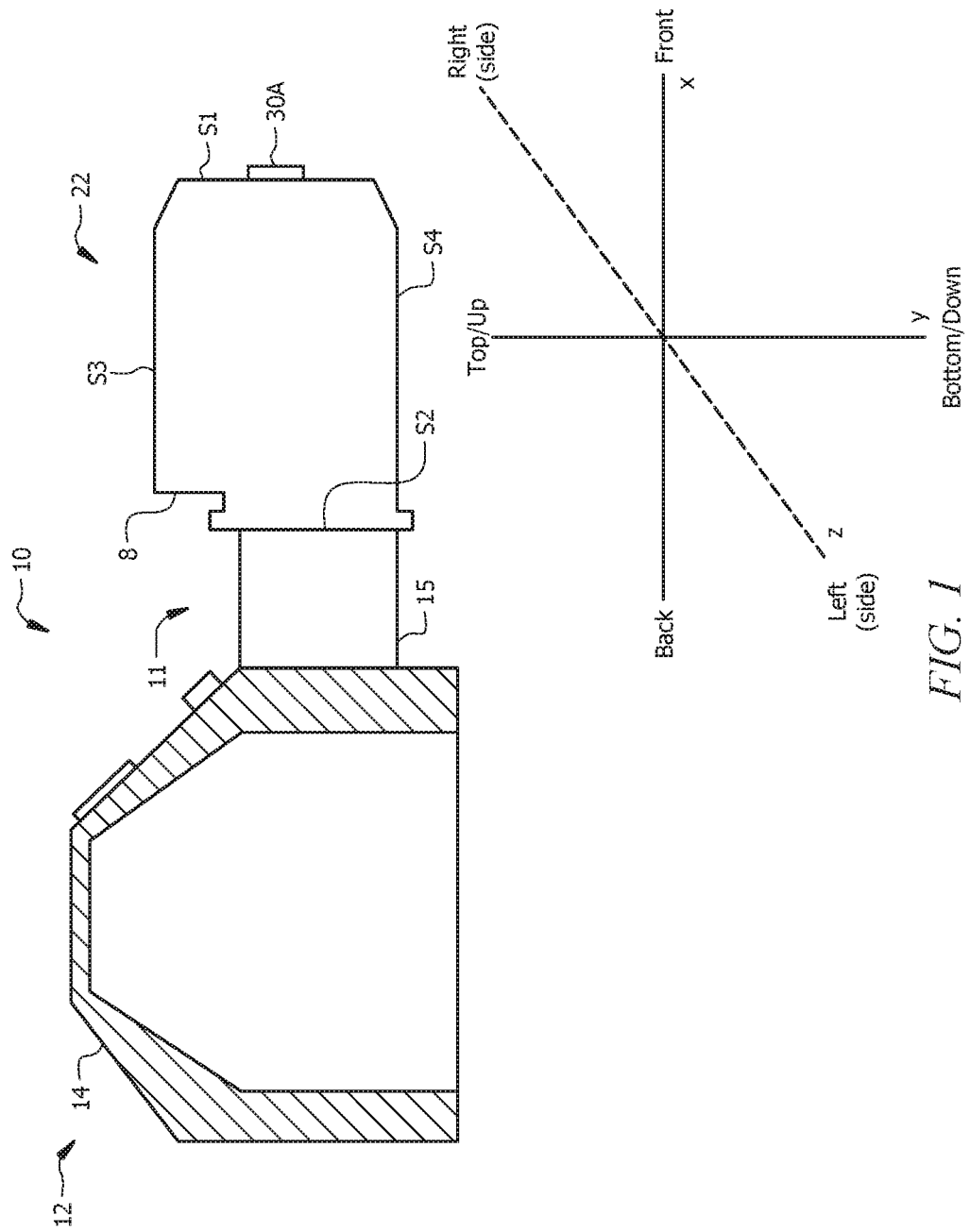
FIG. 1 is an elevational view of a reciprocating pump, according to embodiments of this disclosure.

A reciprocating apparatus of this disclosure may comprise any suitable pump operable to pump fluid. Non-limiting examples of suitable pumps include, but are not limited to, piston pumps, plunger pumps, and the like. In embodiments, the pump is a rotary- or reciprocating-type pump such as a positive displacement pump operable to displace pressurized fluid. The pump comprises a pump power end, a pump fluid end, and an integration section whereby a reciprocating element (e.g., a plunger) can be mechanically connected with the pump power end such that the reciprocating element can be reciprocated within a reciprocating element bore of the pump fluid end. FIG. 1 is an elevational view (e.g., side view) of a pump 10 (e.g., a reciprocating pump) according to an exemplary embodiment, the reciprocating pump comprising a pump power end 12, a pump fluid end 22, and an integration section 11. As illustrated in FIG. 1, pump fluid end has a front S1 opposite a back S2 along a first or x-axis, a top S3 opposite a bottom S4 along a second or y-axis, wherein the y-axis is in the same plane as and perpendicular to the x-axis, and a left side and a right side along a z-axis, wherein the z-axis is along a plane perpendicular to the plane of the x-axis and the y-axis. Accordingly, toward the top of pump fluid end 22 (and pump 10) is along the y-axis toward top S3, toward the bottom of pump fluid end 22 (and pump 10) is along the y-axis toward bottom S4, toward the front of pump fluid end 22 (and pump 10) is along the x-axis toward front S1, and toward the back of pump fluid end 22 (and pump 10) is along the x-axis away from front S1.

Figure 2A:
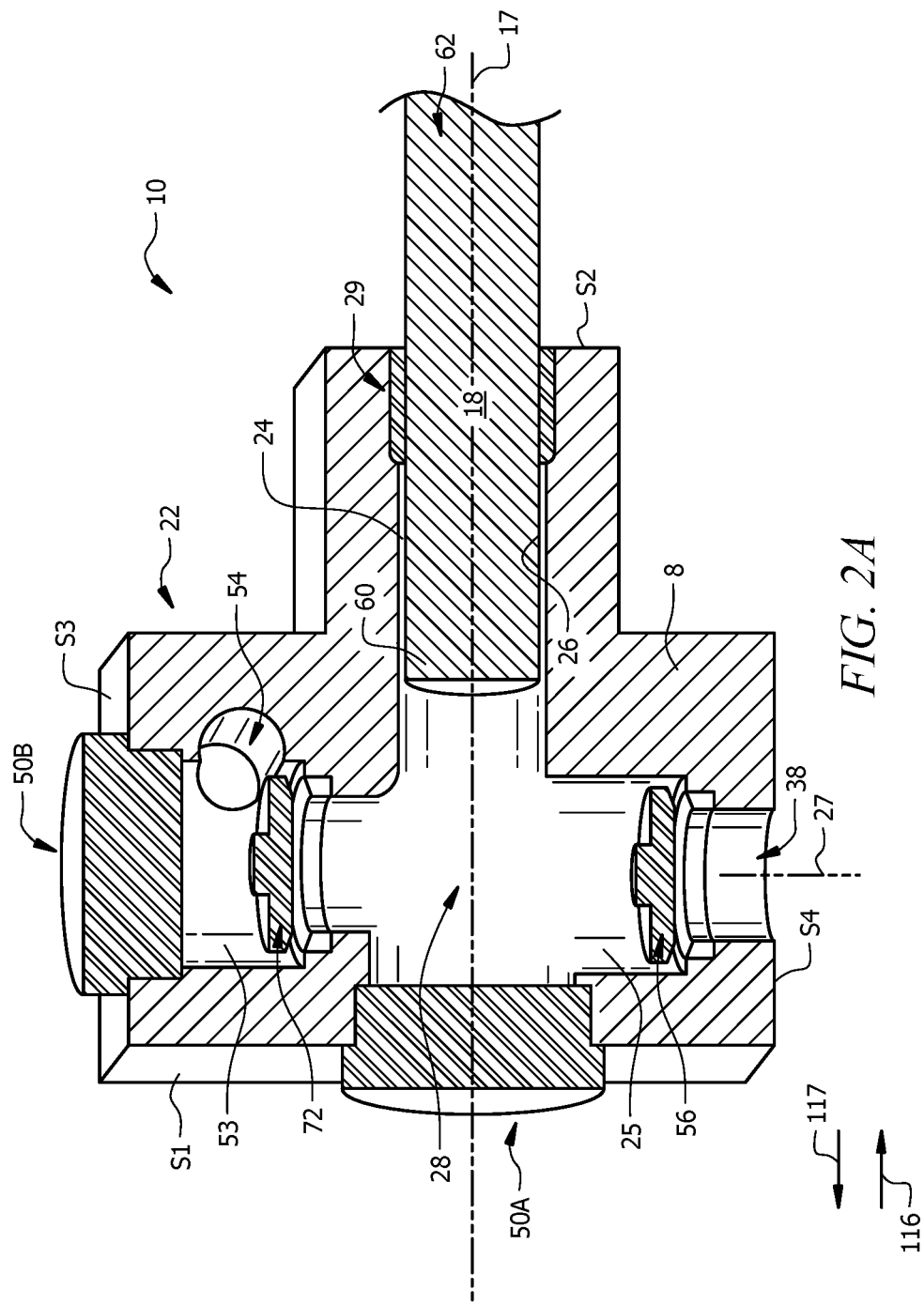
FIG. 2A is a cut-away illustration of an exemplary reciprocating pump comprising a cross-bore pump fluid end, according to embodiments of the present disclosure.
Figure 2B:
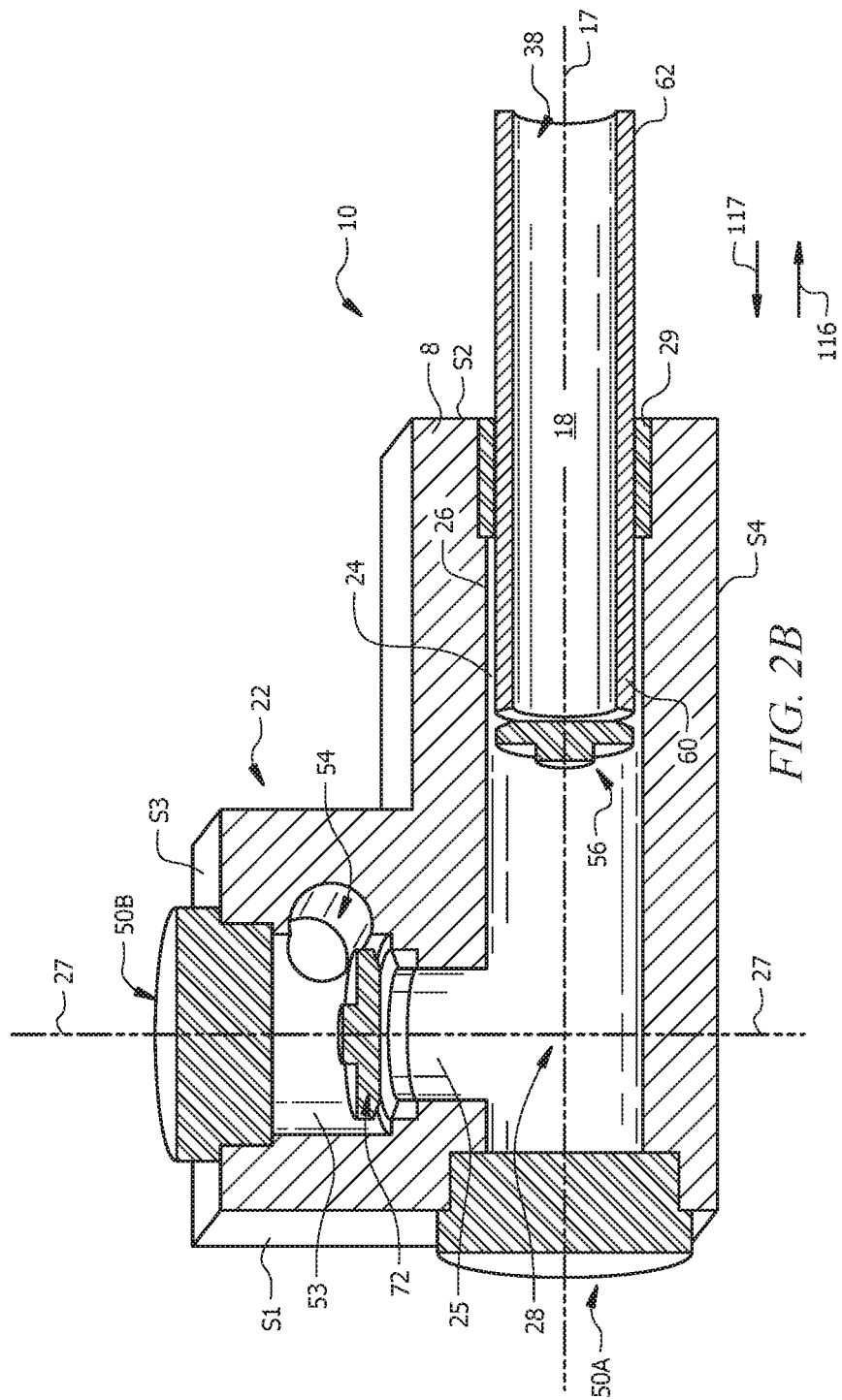
FIG. 2B is a cut-away illustration of an exemplary reciprocating pump comprising a cross-bore pump fluid end, according to other embodiments of the present disclosure.
Figure 3:
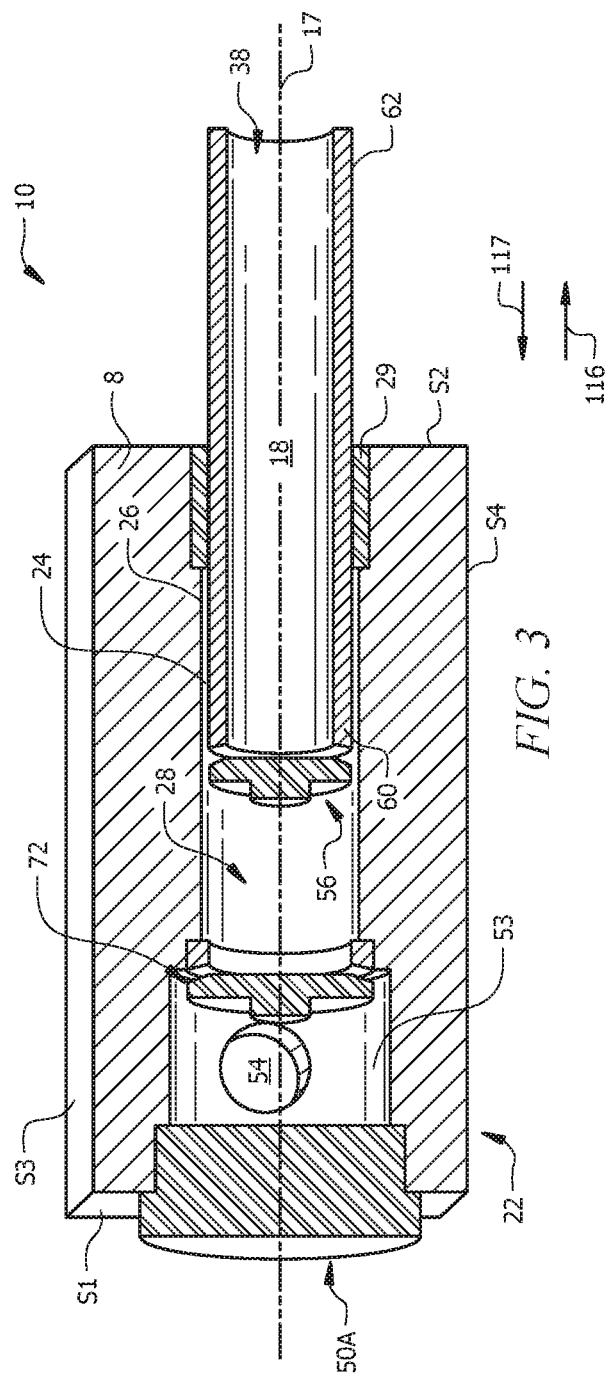
FIG. 3 is a cut-away illustration of an exemplary reciprocating pump comprising a concentric bore pump fluid end, according to embodiments of the present disclosure.

The pump fluid end 22 is integrated with the pump power end 12 via the integration section 11, such that pump power end 12 is operable to reciprocate the reciprocating element 18 within a reciprocating element bore 24 (FIGS. 2-3) of the pump fluid end 22. The reciprocating element bore 24 is at least partially defined by a cylinder wall 26. As described further hereinbelow with reference to FIGS. 2A-2B and FIG. 3, pump fluid end 22 can be a multi-bore pump fluid end (also referred to herein as a cross-bore pump fluid end) 22 or, alternatively, an in-line or "concentric" bore pump fluid end. As utilized herein, multi-bore pump fluid ends can comprise "T-bore" pump fluid ends, "X-bore" (e.g., cross shaped bore) pump fluid ends, or "Y-bore" pump fluid ends. FIG. 2A is a schematic showing a cross-bore pump fluid end 22 engaged with a reciprocating element 18, wherein the cross-bore pump fluid end 22 comprises a cross-bore 25 that makes a cross shape (+) relative to reciprocating element bore 24. FIG. 2B is a schematic showing a cross-bore pump fluid end 22 engaged with a reciprocating element 18, wherein the cross bore pump fluid end 22 comprises a tee-bore 25 that makes a "T" shape relative to reciprocating element bore 24. FIG. 3 is a schematic showing a concentric bore pump fluid end 22 engaged with a reciprocating element 18. As discussed further below, the pump 10 includes at least one fluid inlet 38 for receiving fluid from a fluid source, e.g., a suction line, suction header, storage or mix tank, blender, discharge from a boost pump such as a centrifugal pump, etc. The pump 10 also includes at least one discharge outlet 54 for discharging fluid to a discharge source, e.g., a flowmeter, pressure monitoring and control system, distribution header, discharge line, wellhead, discharge manifold pipe, and the like.

The pump 10 may comprise any suitable pump power end 12 for enabling the pump 10 to perform pumping operations (e.g., pumping a wellbore servicing fluid downhole). Similarly, the pump 10 may include any suitable housing 14 for containing and/or supporting the pump power end 12 and components thereof. The housing 14 may comprise various combinations of inlets, outlets, channels, and the like for circulating and/or transferring fluid. Additionally, the housing 14 may include connections to other components and/or systems, such as, but not limited to, pipes, tanks, drive mechanisms, etc. Furthermore, the housing 14 may be configured with cover plates or entryways for permitting access to the pump power end 12 and/or other pump components. As such, the pump 10 may be inspected to determine whether parts need to be repaired or replaced. The pump power end may also be hydraulically driven, whether it is a non-intensifying or an intensifying system.

Figure 4:
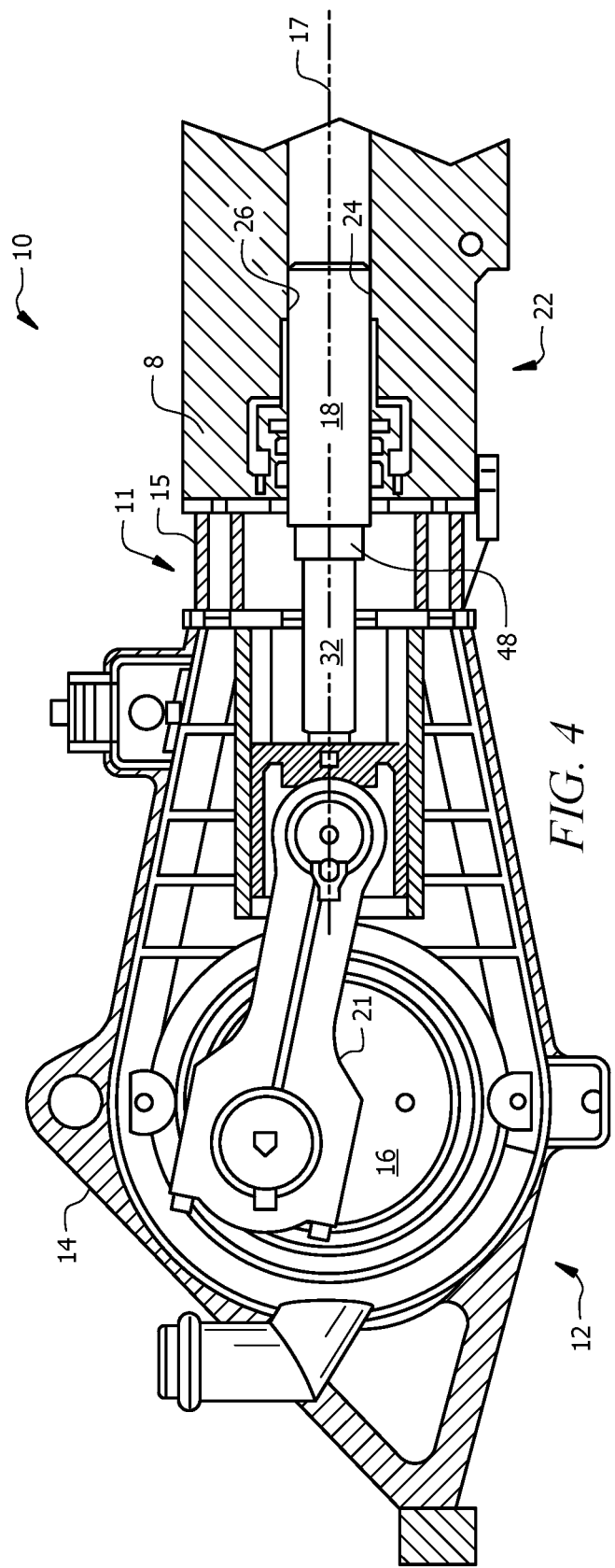
FIG. 4 is cut-away illustration of a pump power end of a pump, according to embodiments of the present disclosure.

Those versed in the art will understand that the pump power end 12 may include various components commonly employed in pumps. Pump power end 12 can be any suitable pump known in the art and with the help of this disclosure to be operable to reciprocate reciprocating element 18 in reciprocating element bore 24. For example, without limitation, pump power end 12 can be operable via and comprise a crank and slider mechanism, a powered hydraulic/pneumatic/steam cylinder mechanism or various electric, mechanical or electro-mechanical drives. FIG. 4 provides a cutaway illustration of an exemplary pump 10 of this disclosure, showing an exemplary pump power end 12, integrated via integration section 11 with a pump fluid end 22, wherein the pump power end 12 is operable to reciprocate the reciprocating element 18 within a reciprocating element bore 24 of the pump fluid end 22. Briefly, for example, the pump power end 12 may include a rotatable crankshaft 16 attached to at least one reciprocating element 18 (e.g., a plunger or piston) by way of a crank arm/connecting rod 21. Additionally, an engine (e.g., a diesel engine), motor, or other suitable power source may be operatively connected to the crankshaft 16 (e.g., through a transmission and drive shaft) and operable to actuate rotation thereof. In operation, rotation of the crankshaft 16 induces translational movement of the crank arm/connecting rod 21, thereby causing the reciprocating element 18 to extend and retract along a flow path, which may generally be defined by a central axis 17 within a reciprocating element bore 24 (sometimes referred to herein for brevity as a "reciprocating element bore 24" or simply a "bore 24", and not wishing to be limited to a particular reciprocating element 18). Pump 10 of FIG. 1 is typically mounted on a movable structure such as a semi-tractor trailer or skid, and the moveable structure may contain additional components, such as a motor or engine (e.g., a diesel engine), that provides power (e.g., mechanical motion) to the pump power end 12 (e.g., a crankcase comprising crankshaft 16 and related connecting rods 21).

Of course, numerous other components associated with the pump power end 12 of the pump 10 may be similarly employed, and therefore, fall within the purview of the present disclosure. Furthermore, since the construction and operation of components associated with pumps of the sort depicted in FIG. 1 are well known and understood, discussion of the pump 10 will herein be limited to the extent necessary for enabling a proper understanding of the disclosed embodiments.

As noted hereinabove, the pump 10 comprises a pump fluid end 22 attached to the pump power end 12. Various embodiments of the pump fluid end 22 are described in detail below in connection with other drawings, for example FIGS. 2A-2B and FIG. 3. Generally, the pump fluid end 22 comprises at least one fluid inlet 38 for receiving fluid, and at least one discharge outlet 54 through which fluid flows out of the discharge chamber 53. The pump fluid end 22 also comprises at least one valve assembly for controlling the receipt and output of fluid. For example, the pump fluid end 22 can comprise a suction valve assembly 56 and a discharge valve assembly 72. According to this disclosure, at least one of the suction valve assembly 56 and the discharge valve assembly 72 is provided by a valve assembly 20, as described hereinbelow with reference to FIG. 5A, FIG. 5B, FIG. 5C, FIG. 5D, FIG. 6, FIG. 7, FIG. 8, and FIG. 9. The pump fluid end 22 may include any suitable component(s) and/or structure(s) for containing and/or supporting the reciprocating element 18 and providing a cylinder wall 26 at least partially defining a reciprocating element bore 24 along which the pump power end can reciprocate the reciprocating element during operation of the pump.

In embodiments, the pump fluid end 22 may comprise a cylinder wall 26 at least partially defining a bore 24 through which the reciprocating element 18 may extend and retract. Additionally, the bore 24 may be in fluid communication with a discharge chamber 53 formed within the pump fluid end 22. Such a discharge chamber 53, for example, may be configured as a pressurized discharge chamber 53 having a discharge outlet 54 through which fluid is discharged by the reciprocating element 18. Thus, the reciprocating element 18 may be movably disposed within the reciprocating element bore 24, which may provide a fluid flow path into and/or out of the pump chamber. During operation of the pump 10, the reciprocating element 18 may be configured to reciprocate along a path (e.g., along central axis 17 within bore 24 and/or pump chamber 28, which corresponds to reciprocal movement parallel to the x-axis of FIG. 1) to transfer a supply of fluid to the pump chamber 28 and/or discharge fluid from the pump chamber 28.

In operation, the reciprocating element 18 extends and retracts along a flow path to alternate between providing forward strokes (also referred to as discharge strokes and correlating to movement in a positive direction parallel to the x-axis of FIG. 1, indicated by arrow 117) and return strokes (also referred to as suction strokes and correlating to movement in a negative direction parallel to the x-axis of FIG. 1, indicated by arrow 116), respectively. During a forward stroke, the reciprocating element 18 extends away from the pump power end 12 and toward the pump fluid end 22. Before the forward stoke begins, the reciprocating element 18 is in a fully retracted position (also referred to as bottom dead center (BDC) with reference to the crankshaft 16), in which case the suction valve assembly 56 can be in a closed configuration having allowed fluid to flow into the (e.g., high pressure) pump chamber 28. (As utilized here, "high pressure" indicates possible subjection to high pressure during discharge.) When discharge valve assembly 72 is in a closed configuration (e.g., under the influence of a closing mechanism, such as a spring), the high pressure in a discharge pipe or manifold containing discharge outlet 54 prevents fluid flow into discharge chamber 53 and causes pressure in the pump chamber 28 to accumulate upon stroking of the reciprocating element 18. When the reciprocating element 18 begins the forward stroke, the pressure builds inside the pump chamber 28 and acts as an opening force that results in positioning of the discharge valve assembly 72 in an open configuration, while a closing force (e.g., via a closing mechanism, such as a spring and/or pressure increase inside pump chamber 28) urges the suction valve assembly 56 into a closed configuration. When utilized in connection with a valve assembly, 'open' and 'closed' refer, respectively, to a configuration in which fluid can flow through the valve assembly (e.g., can pass between a valve body (e.g., a movable poppet) and a carrier or a valve seat thereof) and a configuration in which fluid cannot flow through the valve assembly (e.g., cannot pass between a valve body (e.g., a movable poppet) and a carrier or a valve seat thereof). As the reciprocating element 18 extends forward, fluid within the pump chamber 28 is discharged through the discharge outlet 54.

During a return stroke, the reciprocating element 18 reciprocates or retracts away from the pump fluid end 22 and towards the pump power end 12 of the pump 10. Before the return stroke begins, the reciprocating element 18 is in a fully extended position (also referred to as top dead center (TDC) with reference to the crankshaft 16), in which case the discharge valve assembly 72 can be in a closed configuration having allowed fluid to flow out of the pump chamber 28 and the suction valve assembly 56 is in a closed configuration. When the reciprocating element 18 begins and retracts towards the pump power end 12, the discharge valve assembly 72 assumes a closed configuration, while the suction valve assembly 56 opens. As the reciprocating element 18 moves away from the discharge valve 72 during a return stroke, fluid flows through the suction valve assembly 56 and into the pump chamber 28.

With reference to the embodiments of FIG. 2A, which is a schematic showing a cross-bore pump fluid end 22 engaged with a reciprocating element 18, cross-bore pump fluid end 22 comprises a cross-bore fluid end body 8, a cross-bore pump chamber 28, a suction valve assembly 56, and a discharge valve assembly 72. In this cross-bore configuration, suction valve assembly 56 and discharge valve assembly 72 are located in a bore or channel 25 (also referred to herein as a cross bore 25) of pump chamber 28, wherein bore 25 has a central axis 27 that is parallel to the y-axis of FIG. 1 and is perpendicular to bore 24 in which reciprocating element 18 reciprocates during operation. Suction valve assembly 56 and discharge valve assembly 72 are operable to direct fluid flow within the pump 10. When reciprocating element 18 retracts, or moves along central axis 17 in a direction away from the pump chamber 28 and the pump fluid end 22 and toward the pump power end 12 (as indicated by arrow 116), a suction valve of the suction valve assembly 56 opens (e.g., either under natural flow or other biasing means), and a discharge valve of discharge valve assembly 72 will be closed, whereby fluid enters pump chamber 28 via fluid inlet 38. When the reciprocating element 18 reverses direction, due to the action of the pump power end 12, the reciprocating element 18 reverses direction along central axis 17, now moving in a direction toward the pump chamber 28 and pump fluid end 22 and away from pump power end 12 (as indicated by arrow 117), and the discharge valve of discharge valve assembly 72 is open and the suction valve of suction valve assembly 56 is closed (e.g., again either due to fluid flow and/or other biasing means of valve control), such that fluid is pumped out of pump chamber 28 via discharge outlet 54.

With reference to the embodiment of FIG. 2B, which is a schematic showing a T-bore pump fluid end 22 engaged with a reciprocating element 18, T-bore pump fluid end 22 comprises a T-bore fluid end body 8, a T-shaped pump chamber 28, a suction valve assembly 56, and a discharge valve assembly 72. In this T-bore configuration of FIG. 2B, suction valve assembly 56 is coupled with front end 60 of reciprocating element 18 and discharge valve assembly 72 is positioned in bore 25 that makes a tee with reciprocating element bore 24, i.e., central axis 17 of reciprocating element bore 24 is also the central axis of suction pump assembly 56 and perpendicular to a central axis 27 of discharge valve assembly 72 (i.e., central axis 27 is parallel to the y-axis of FIG. 1 and is perpendicular to bore 24 in which reciprocating element 18 reciprocates during operation). Suction valve assembly 56 and discharge valve assembly 72 are operable to direct fluid flow within the pump 10. When reciprocating element 18 retracts, or moves along central axis 17 in a direction away from the pump chamber 28 and the pump fluid end 22 and toward the pump power end 12 (as indicated by arrow 116), a suction valve of the suction valve assembly 56 opens (e.g., either under natural flow or other biasing means), and a discharge valve of discharge valve assembly 72 will be closed, whereby fluid enters pump chamber 28 via fluid inlet 38. When the reciprocating element 18 reverses direction, due to the action of the pump power end 12, the reciprocating element 18 reverses direction along central axis 17, now moving in a direction toward the pump chamber 28 and pump fluid end 22 and away from pump power end 12 (as indicated by arrow 117), and the discharge valve of discharge valve assembly 72 is open and the suction valve of suction valve assembly 56 is closed (e.g., again either due to fluid flow and/or other biasing means of valve control), such that fluid is pumped out of pump chamber 28 via discharge outlet 54.

With reference to the embodiment of FIG. 3, which is a schematic showing a concentric pump fluid end 22 engaged with a reciprocating element 18, concentric bore pump fluid end 22 comprises a concentric bore fluid end body 8, a concentric pump chamber 28, a suction valve assembly 56, and a discharge valve assembly 72. In this concentric bore configuration, suction valve assembly 56 and discharge valve assembly 72 are positioned in-line (also referred to as coaxial) with reciprocating element bore 24, i.e., central axis 17 of reciprocating element bore 24 is also the central axis of suction pump assembly 56 and discharge valve assembly 72). Suction valve assembly 56 and discharge valve assembly 72 are operable to direct fluid flow within the pump 10. In some concentric bore fluid end designs, fluid flows within a hollow reciprocating element (e.g., a hollow plunger) 18. In some such embodiments, the reciprocating element bore 24 of such a concentric bore fluid end design can be defined by a high pressure cylinder 26 providing a high pressure chamber and a low pressure cylinder (not depicted in the embodiment of FIG. 3) providing a low pressure chamber toward tail end 62 of reciprocating element 18, whereby fluid from fluid inlet 38 enters reciprocating element 18. When reciprocating element 18 retracts, or moves along central axis 17 in a direction away from the pump chamber 28 and pump fluid end 22 and toward pump power end 12 (as indicated by arrow 116), a suction valve of the suction valve assembly 56 opens (e.g., either under natural flow and/or other biasing means), and a discharge valve of discharge valve assembly 72 will be closed, whereby fluid enters pump chamber 28 via a fluid inlet 38. For a concentric bore pump fluid end 22 design, the fluid inlet can be configured to introduce fluid into pump chamber 28 via a reciprocating element 18 that is hollow and/or via a low pressure chamber as described above. When the reciprocating element 18 reverses direction, due to the action of the pump power end 12, the reciprocating element 18 reverses direction along central axis 17, now moving in a direction toward the pump chamber 28 and pump fluid end 22 and away from pump power end 12 (as indicated by arrow 117), and the discharge valve of discharge valve assembly 72 is open and the suction valve of suction valve assembly 56 is closed (e.g., again either due to fluid flow and/or other biasing means of valve control), such that fluid is pumped out of pump chamber 28 via discharge chamber 53 and discharge outlet 54.

A pump 10 of this disclosure can comprise one or more access ports. For example, with reference to the cross-bore fluid end body 8 embodiments of FIG. 2A and FIG. 2B, a front access port 50A can be located on a front S1 of the pump fluid end 22 opposite a back S2 of the pump fluid end 22, wherein the back S2 of the pump fluid end is proximal the pump power end 12, upon integration therewith via integration section 11. A top access port 50B can be located on a top S3 of the pump fluid end 22 opposite a bottom S4 of the pump fluid end 22, wherein the top S1 of the pump fluid end 22 is above central axis 17 and the bottom S4 of the pump fluid end 22 is below central axis 17. With reference to the concentric fluid end body 8 embodiment of FIG. 3, a front access port 50A can be located on a front S1 of the pump fluid end 22 opposite a back S2 of the pump fluid end 22, wherein the back S2 of the pump fluid end is proximal the pump power end 12, upon integration therewith via integration section 11. Locations described as front S1, back S2, top S3, and bottom S4 are further described with reference to the x-y-z coordinate system shown in FIG. 1 and further can be relative to a surface (e.g., a trailer bed, the ground, a platform, etc.) upon which the pump 10 is located, a bottom S4 of the pump fluid end being proximal the surface (e.g., trailer bed) upon which the pump 10 is located. Generally, due to size and positioning of pump 10, the front S1 and top S3 of the pump fluid end 22 are more easily accessible than a back S2 or bottom S4 thereof. In a similar manner, a front of pump 10 is distal the pump power end 12 and a back of the pump 10 is distal the pump fluid end 22. The integration section 11 can be positioned in a space between the pump fluid end 22 and the pump power end 12, and can be safeguarded (e.g., from personnel) via a cover 15.

In embodiments, a pump fluid end 22 and pump 10 of this disclosure comprise at least one access port located on a side of the discharge valve assembly 72 opposite the suction valve assembly 56. For example, in the cross-bore pump fluid end 22 embodiment of FIG. 2A, top access port 50B is located on a side (e.g., top side) of discharge valve assembly 72 opposite suction valve assembly 56, while in the concentric bore pump fluid end 22 embodiment of FIG. 3, front access port 50A is located on a side (e.g., front side) of discharge valve assembly 72 opposite suction valve assembly 56.

In embodiments, one or more seals 29 (e.g., "o-ring" seals, packing seals, or the like), also referred to herein as 'primary' reciprocating element packing 29 (or "packing 29") may be arranged around the reciprocating element 18 to provide sealing between the outer walls of the reciprocating element 18 and the inner walls 26 defining at least a portion of the reciprocating element bore 24. The inner walls 26 may be provided by fluid end body 8 or a sleeve within reciprocating element bore 24, as described below. In some concentric bore fluid end designs, a second set of seals (also referred to herein as 'secondary' reciprocating element packing; not shown in the Figures) may be fixedly arranged around the reciprocating element 18 to provide sealing between the outer walls of the reciprocating element 18 and the inner walls of a low-pressure cylinder that defines the low pressure chamber described hereinabove (e.g., wherein the secondary packing is farther back along the x-axis and delineates a back end of the low pressure chamber that extends from the primary packing 29 to the secondary packing). In embodiments, only a primary reciprocating element packing is utilized, as fluid enters tail end 62 of reciprocating element 18 without first contacting an outer peripheral wall thereof (i.e., no secondary reciprocating element packing is needed/utilized, because no low pressure chamber external to reciprocating element 18 is utilized). Skilled artisans will recognize that the seals may comprise any suitable type of seals, and the selection of seals may depend on various factors e.g., fluid, temperature, pressure, etc.

While the foregoing discussion focused on a pump fluid end 22 comprising a single reciprocating element 18 disposed in a single reciprocating element bore 24, it is to be understood that the pump fluid end 22 may include any suitable number of reciprocating elements. As discussed further below, for example, the pump 10 may comprise a plurality of reciprocating elements 18 and associated reciprocating element bores 24 arranged in parallel and spaced apart along the z-axis of FIG. 1 (or another arrangement such as a V block or radial arrangement). In such a multi-bore pump, each reciprocating element bore may be associated with a respective reciprocating element and crank arm, and a single common crankshaft may drive each of the plurality of reciprocating elements and crank arms. Alternatively, a multi-bore pump may include multiple crankshafts, such that each crankshaft may drive a corresponding reciprocating element. Furthermore, the pump 10 may be implemented as any suitable type of multi-bore pump. In a non-limiting example, the pump 10 may comprise a Triplex pump having three reciprocating elements 18 (e.g., plungers or pistons) and associated reciprocating element bores 24, discharge valve assemblies 72 and suction valve assemblies 56, or a Quintuplex pump having five reciprocating elements 18 and five associated reciprocating element bores 24, discharge valve assemblies 72 and suction valve assemblies 56.

Reciprocating element bore 24 can have an inner diameter slightly greater than the outer diameter of the reciprocating element 18, such that the reciprocating element 18 may sufficiently reciprocate within reciprocating element bore 24 (optionally, within a sleeve, as described hereinbelow). In embodiments, the fluid end body 8 of pump fluid end 22 has a pressure rating ranging from about 100 psi to about 3000 psi, or from about 2000 psi to about 10,000 psi, from about 5000 psi to about 30,000 psi, or from about 3000 psi to about 50,000 psi or greater. The fluid end body 8 of pump fluid end 22 may be cast, forged, machined, printed or formed from any suitable materials, e.g., steel, metal alloys, or the like. Those versed in the art will recognize that the type and condition of material(s) suitable for the fluid end body 8 may be selected based on various factors. In a wellbore servicing operation, for example, the selection of a material may depend on flow rates, pressure rates, wellbore service fluid types (e.g., particulate type and/or concentration present in particle laden fluids such as fracturing fluids or drilling fluids, or fluids comprising cryogenic/foams), etc. Moreover, the fluid end body 8 (e.g., cylinder wall 26 defining at least a portion of reciprocating element bore 24 and/or pump chamber 28) may include protective coatings for preventing and/or resisting abrasion, erosion, and/or corrosion.

In embodiments, the cylindrical shape (e.g., providing cylindrical wall(s) 26) of the fluid end body 8 may be pre-stressed in an initial compression. Moreover, a high-pressure cylinder(s) providing the cylindrical shape (e.g., providing cylindrical wall(s) 26) may comprise one or more sleeves (e.g., heat-shrinkable sleeves). Additionally or alternatively, the high-pressure cylinder(s) may comprise one or more composite overwraps and/or concentric sleeves ("over-sleeves"), such that an outer wrap/sleeve pre-loads an inner wrap/sleeve. The overwraps and/or over-sleeves may be non-metallic (e.g., fiber windings) and/or constructed from relatively lightweight materials. Overwraps and/or over-sleeves may be added to increase fatigue strength and overall reinforcement of the components.

The cylinders and cylindrical-shaped components (e.g., providing cylindrical wall 26) associated with the pump fluid end body 8 of pump fluid end 22 may be held in place within the pump 10 using any appropriate technique. For example, components may be assembled and connected, e.g., bolted, welded, etc. Additionally or alternatively, cylinders may be press-fit (e.g., interference fit) into openings machined or cast into the pump fluid end 22 or other suitable portion of the pump 10. Such openings may be configured to accept and rigidly hold cylinders (e.g., having cylinder wall(s) 26 at least partially defining reciprocating element bore 24) in place so as to facilitate interaction of the reciprocating element 18 and other components associated with the pump 10.

In embodiments, the reciprocating element 18 comprises a plunger or a piston. While the reciprocating element 18 may be described herein with respect to embodiments comprising a plunger, it is to be understood that the reciprocating element 18 may comprise any suitable component for displacing fluid. In a non-limiting example, the reciprocating element 18 may be a piston. As those versed in the art will readily appreciate, a piston-type pump generally employs sealing elements (e.g., rings, packing, etc.) attached to the piston and movable therewith. In contrast, a plunger-type pump generally employs fixed or static seals (e.g., primary seal or packing 29) through which the plunger moves during each stroke (e.g., suction stroke or discharge stroke).

As skilled artisans will understand, the reciprocating element 18 may include any suitable size and/or shape for extending and retracting along a flow path within the pump fluid end 22. For instance, reciprocating element 18 may comprise a generally cylindrical shape, and may be sized such that the reciprocating element 18 can sufficiently slide against or otherwise interact with the inner cylinder wall 26. In embodiments, one or more additional components or mechanical linkages 48 (FIG. 4; e.g., clamps, adapters, extensions, etc.) may be used to couple the reciprocating element 18 to the pump power end 12 (e.g., to a pushrod 9).

In some embodiments (e.g., cross-bore pump fluid end 22 embodiments such as FIG. 2A), the reciprocating element may be substantially solid and/or impermeable (e.g., not hollow). In alternative embodiments (e.g., tee-bore pump fluid end 22 embodiment such as FIG. 2B and concentric bore pump fluid end 22 embodiment such as FIG. 3), the reciprocating element 18 comprises a peripheral wall defining a hollow body. Additionally (e.g., tee-bore pump fluid end 22 embodiments such as FIG. 2B and concentric bore pump fluid end 22 embodiments such as FIG. 3), a portion of the peripheral wall of reciprocating element 18 may be generally permeable or may include an input through which fluid may enter the hollow body and an output through which fluid may exit the hollow body. Furthermore, while the reciprocating element 18 may, in embodiments, define a substantially hollow interior and include a ported body, a base of the reciprocating element 18 proximal the pump power end 12, when assembled, may be substantially solid and/or impermeable (e.g., a plunger having both a hollow portion and a solid portion).

The reciprocating element 18 comprises a front or free end 60. In embodiments comprising concentric bore pump fluid end designs 22 such as shown in FIG. 3, the reciprocating element 18 can contain or at least partially contain the suction valve assembly 56. In one aspect, the suction valve assembly 56 is at least partially disposed within the reciprocating element 18 at or proximate to the front end 60 thereof. At an opposite or tail end 62 (also referred to as back end 62) of the reciprocating element 18, the reciprocating element 18 may include a base coupled to the pump power end 12 of the pump 10 (e.g., via crank arm 21). In embodiments, the tail end 62 of the reciprocating element 18 is coupled to the pump power end 12 outside of pump fluid end 22, e.g., within integration section 11.

As noted above, pump fluid end 22 contains a suction valve assembly 56. Suction valve assembly 56 may alternately open or close to permit or prevent fluid flow. Skilled artisans will understand that the suction valve assembly 56 may be of any suitable type or configuration (e.g., gravity- or spring-biased, flow activated, etc.). Those versed in the art will understand that the suction valve assembly 56 may be disposed within the pump fluid end 22 at any suitable location therein. For instance, the suction valve assembly 56 may be disposed within the bore 25 below central axis 17 of the pump fluid end 22, in cross-bore pump fluid end 22 designs such as FIG. 2A, such that a suction valve body (e.g., a poppet assembly) of the suction valve assembly 56 moves toward central axis 17 when the suction valve assembly 56 opening and away from the central axis 17 when the suction valve assembly 56 is closing. The suction valve assembly 56 may be disposed within reciprocating element bore 24 and at least partially within reciprocating element 18 in tee-bore pump fluid end 22 designs such as FIG. 2B and concentric bore pump fluid end 22 designs such as FIG. 3, such that a suction valve body (e.g., a poppet assembly) of the suction valve assembly 56 moves away from the reciprocating element 18 when the suction valve assembly 56 approaches an open configuration (i.e., is opening) and toward reciprocating element 18 when the suction valve assembly 56 approaches a closed configuration (i.e., is closing).

Pump 10 comprises a discharge valve assembly 72 for controlling the output of fluid through discharge chamber 53 and discharge outlet 54. Analogous to the suction valve assembly 56, the discharge valve assembly 72 may alternately open or close to permit or prevent fluid flow. Those versed in the art will understand that the discharge valve assembly 72 may be disposed within the pump chamber at any suitable location therein. For instance, the discharge valve assembly 72 may be disposed within the bore 25 proximal the top S3 of the pump fluid end 22, in cross-bore pump fluid end 22 designs such as FIG. 2A and tee-bore pump fluid end 22 designs such as FIG. 2B, such that a discharge valve body (e.g., a poppet assembly) of the discharge valve assembly 72 moves toward the discharge chamber 53 when the discharge valve assembly 72 approaches an open configuration and away from the discharge chamber 53 when the discharge valve assembly 72 approaches a closed configuration. The discharge valve assembly 72 may be disposed proximal the front S1 of bore 24 of the pump fluid end 22 (e.g., at least partially within discharge chamber 53 and/or pump chamber 28) in concentric bore pump fluid end 22 designs such as FIG. 3, such that a discharge valve body (e.g., poppet assembly) of the discharge valve assembly 72 moves toward the discharge chamber 53 when the discharge valve assembly 72 approaches an open configuration and away from the discharge chamber 53 when the discharge valve assembly 72 approaches a closed configuration. In addition, the discharge valve assembly 72 may be co-axially aligned with the suction valve assembly 56 (e.g., along central axis 17 in concentric bore pump fluid end 22 configurations such as FIG. 3 or along central axis 27 of bore 25 perpendicular to central axis 17 in cross-bore pump fluid end 22 configurations such as FIG. 2A and FIG. 2B). In concentric bore pump fluid end 22 configurations such as FIG. 3, the suction valve assembly 56 and the discharge valve assembly 72 may be coaxially aligned with the reciprocating element 18 (e.g., along central axis 17).

Further, the suction valve assembly 56 and the discharge valve assembly 72 can comprise any suitable mechanism for opening and closing valves. For example, the suction valve assembly 56 and the discharge valve assembly 72 can comprise a suction valve spring and a discharge valve spring, respectively. Additionally, any suitable structure (e.g., valve assembly comprising sealing rings, stems, valve guides, poppets, etc.) and/or components may be employed for retaining the components of the suction valve assembly 56 and the components of the discharge valve assembly 72 within the pump fluid end 22. For example, the discharge valve assembly 72 and/or the suction valve assembly 56 can comprise a valve poppet, as described, for example, in U.S. patent application Ser. No. 16/436,356 filed Jun. 10, 2019 and entitled "Multi-Material Frac Valve Poppet", the disclosure of which is hereby incorporated herein in its entirety for purposes not contrary to this disclosure. Although at least one of the suction valve assembly 56 or the discharge valve assembly 72 of this disclosure comprises a valve assembly 20 as described herein absent a valve seat, in embodiments, the suction valve assembly 56 or the discharge valve assembly 72 can comprise a conventional valve seat and a valve body. That is, the suction valve assembly can comprise a suction valve seat and a suction valve body, or the discharge valve assembly 72 can comprise a discharge valve seat and a discharge valve body. The suction valve body and the discharge valve body can be any known valve bodies, for example, movable valve poppets, and can be wing guided and/or stem guided, or a combination thereof.

The fluid inlet 38 may be arranged within any suitable portion of the pump fluid end 22 and configured to supply fluid to the pump in any direction and/or angle. Moreover, the pump fluid end 22 may comprise and/or be coupled to any suitable conduit (e.g., pipe, tubing, or the like) through which a fluid source may supply fluid to the fluid inlet 38. The pump 10 may comprise and/or be coupled to any suitable fluid source for supplying fluid to the pump via the fluid inlet 38. In embodiments, the pump 10 may also comprise and/or be coupled to a pressure source such as a boost pump (e.g., a suction boost pump) fluidly connected to the pump 10 (e.g., via inlet 38) and operable to increase or "boost" the pressure of fluid introduced to pump 10 via fluid inlet 38. A boost pump may comprise any suitable type including, but not limited to, a centrifugal pump, a gear pump, a screw pump, a roller pump, a scroll pump, a piston/plunger pump, or any combination thereof. For instance, the pump 10 may comprise and/or be coupled to a boost pump known to operate efficiently in high-volume operations and/or may allow the pumping rate therefrom to be adjusted. Skilled artisans will readily appreciate that the amount of added pressure may depend and/or vary based on factors such as operating conditions, application requirements, etc. In one aspect, the boost pump may have an outlet pressure greater than or equal to about 70 psi, about 80 psi, or about 110 psi, providing fluid to the suction side of pump 10 at about said pressures. Additionally or alternatively, the boost pump may have a flow rate of greater than or equal to about 80 BPM, about 70 BPM, and/or about 50 BPM.

As noted hereinabove, the pump 10 may be implemented as a multi-cylinder pump comprising multiple cylindrical reciprocating element bores 24 and corresponding components. In embodiments, the pump 10 is a Triplex pump in which the pump fluid end 22 comprises three reciprocating assemblies, each reciprocating assembly comprising a suction valve assembly 56, a discharge valve assembly 72, a pump chamber 28, a fluid inlet 38, a discharge outlet 54, and a reciprocating element bore 24 within which a corresponding reciprocating element 18 reciprocates during operation of the pump 10 via connection therewith to a (e.g., common) pump power end 12. In embodiments, the pump 10 is a Quintuplex pump in which the pump fluid end 22 comprises five reciprocating assemblies. In a non-limiting example, the pump 10 may be a Q-10™ Quintuplex Pump or an HT-400™ Triplex Pump, produced by Halliburton Energy Services, Inc.

In embodiments, the pump fluid end 22 may comprise an external manifold (e.g., a suction header) for feeding fluid to the multiple reciprocating assemblies via any suitable inlet(s). Additionally or alternatively, the pump fluid end 22 may comprise separate conduits such as hoses fluidly connected to separate inlets for inputting fluid to each reciprocating assembly. Of course, numerous other variations may be similarly employed, and therefore, fall within the scope of the present disclosure.

Those skilled in the art will understand that the reciprocating elements of each of the reciprocating assemblies may be operatively connected to the pump power end 12 of the pump 10 according to any suitable manner. For instance, separate connectors (e.g., cranks arms/connecting rods 21, one or more additional components or mechanical linkages 48, pushrods 9, etc.) associated with the pump power end 12 may be coupled to each reciprocating element body or tail end 62. The pump 10 may employ a common crankshaft (e.g., crankshaft 16) or separate crankshafts to drive the multiple reciprocating elements.

As previously discussed, the fluid inlet(s) 38 may receive a supply of fluid from any suitable fluid source, which may be configured to provide a constant fluid supply. Additionally or alternatively, the pressure of supplied fluid may be increased by adding pressure (e.g., boost pressure) as described previously. In embodiments, the fluid inlet(s) 38 receive a supply of pressurized fluid comprising a pressure ranging from about 30 psi to about 300 psi.

Additionally or alternatively, the one or more discharge outlet(s) 54 may be fluidly connected to a common collection point such as a sump or distribution manifold, which may be configured to collect fluids flowing out of the fluid outlet(s) 54, or another cylinder bank and/or one or more additional pumps.

During pumping, the multiple reciprocating elements 18 will perform forward and returns strokes similarly, as described hereinabove. In embodiments, the multiple reciprocating elements 18 can be angularly offset to ensure that no two reciprocating elements are located at the same position along their respective stroke paths (i.e., the plungers are "out of phase"). For example, the reciprocating elements may be angularly distributed to have a certain offset (e.g., 120 degrees of separation in a Triplex pump) to minimize undesirable effects that may result from multiple reciprocating elements of a single pump simultaneously producing pressure pulses. The position of a reciprocating element is generally based on the number of degrees a pump crankshaft (e.g., crankshaft 16) has rotated from a bottom dead center (BDC) position. The BDC position corresponds to the position of a fully retracted reciprocating element at zero velocity, e.g., just prior to a reciprocating element moving (i.e., in a direction indicated by arrow 117 in FIGS. 2A-2B and FIG. 3) forward in its cylinder. A top dead center position corresponds to the position of a fully extended reciprocating element at zero velocity, e.g., just prior to a reciprocating element moving backward (i.e., in a direction indicated by arrow 116 in FIGS. 2A-2B and FIG. 3) in its cylinder.

As described above, each reciprocating element 18 is operable to draw in fluid during a suction (backward or return) stroke and discharge fluid during a discharge (forward) stroke. Skilled artisans will understand that the multiple reciprocating elements 18 may be angularly offset or phase-shifted to improve fluid intake for each reciprocating element 18. For instance, a phase degree offset (at 360 degrees divided by the number of reciprocating elements) may be employed to ensure the multiple reciprocating elements 18 receive fluid and/or a certain quantity of fluid at all times of operation. In one implementation, the three reciprocating elements 18 of a Triplex pump may be phase-shifted by a 120-degree offset. Accordingly, when one reciprocating element 18 is at its maximum forward stroke position, a second reciprocating element 18 will be 60 degrees through its discharge stroke from BDC, and a third reciprocating element will be 120 degrees through its suction stroke from top dead center (TDC).

Herein disclosed is a valve assembly comprising: a valve body; a hardened insert (or "mini valve seat"), wherein the hardened insert is cylindrical and comprises a primary sealing surface; a sealing insert, wherein the sealing insert is cylindrical and comprises an initial sealing surface; and a carrier having an inside surface. The hardened insert and the sealing insert are coupled to the carrier. In a closed configuration of the valve assembly, the valve body contacts a primary sealing surface of the hardened insert and an initial sealing surface of the carrier to prevent fluid flow through the valve assembly, and, in an open configuration of the valve assembly, the valve body does not contact the primary sealing surface of the hardened insert or the initial sealing surface of the carrier to allow fluid flow through the valve assembly.

The hardened insert and the sealing insert are coupled with or "carried" by the carrier. According to this disclosure, the carrier can comprise a reciprocating element 18, a replaceable valve carrier 40 (as described with reference to FIG. 6 hereinbelow), or a pump fluid end body 8 of a pump fluid end 22 (as described with reference to FIG. 6 hereinbelow). As utilized herein, a "contact" or "sealing" surface 30 is the surface that contacts valve body 3 (described with reference to FIGS. 5-9 hereinbelow) when the valve assembly 20 is in the closed configuration. The contact surface 30 includes the primary sealing surface 30A of the hardened insert 2 that contacts a portion $30C_1$ of a valve body sealing surface 30C, when the valve assembly 20 is in the closed configuration, and the initial sealing surface 30B of the carrier 5 that contacts a second portion $30C_2$ of the valve body sealing surface 30C, when the valve assembly 20 is in the closed configuration. As detailed further hereinbelow, the contact surface 30 of valve assembly 20 of this disclosure is not provided by a conventional valve seat that provides a contact surface between the valve and the valve seat, and the valve assembly 20 disclosed herein comprises sealing insert 13 that is coupled with carrier 5 and stationary relative thereto.

Use of the term "initial" in reference to "initial sealing surface" 30B indicates that the initial sealing surface 30B of the contact surface 30 can contact the valve body 3 before the primary sealing surface 30A contacts the valve body 3 during closing of the valve assembly 20. Similarly, use of the term "primary" in reference to the "primary sealing surface"

30A indicates that the primary sealing surface 30A of the contact surface 30 provides the majority of the seal between the valve body 3 and the contact surface 30 when the valve assembly 20 is in the closed configuration (e.g., takes most of the impact between the valve body 3 and the contact surface 30 during operation of a pump 10 comprising the valve assembly 20).

Figure 5A:
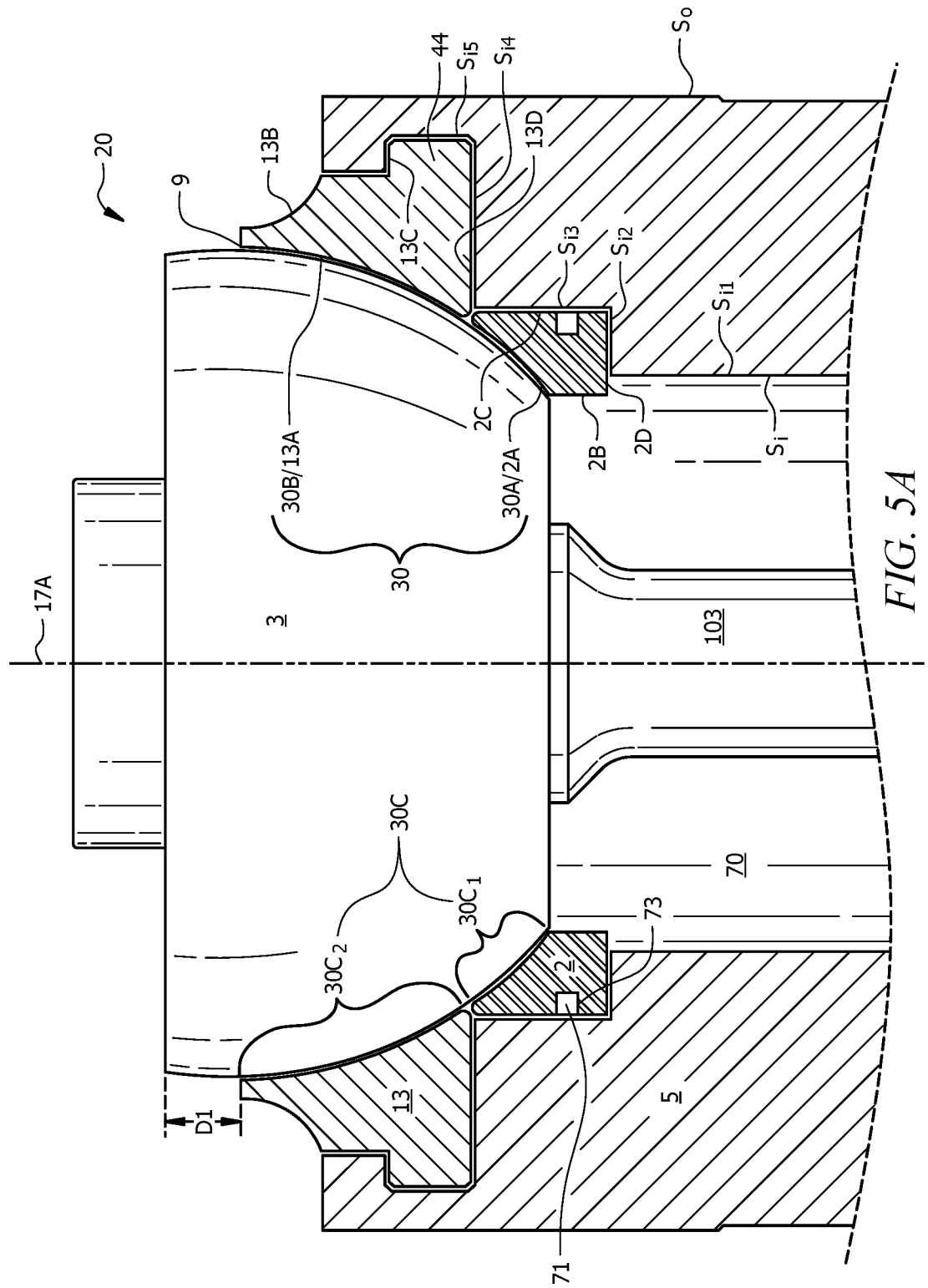
FIG. 5A is a schematic of a valve assembly, according to embodiments of the present disclosure, in a closed configuration.

For example, with reference now to FIG. 5A, which is a schematic of a valve assembly 20 of this disclosure, valve assembly 20 comprises valve body 3, and hardened insert 2 and sealing insert 13 coupled with carrier 5. In the embodiment of FIG. 5A, carrier 5 is provided by reciprocating element 18. As detailed further hereinbelow with reference to FIG. 6 and FIG. 7, carrier 5 can alternatively be provided by a replaceable valve carrier or a pump fluid end body 8.

Contact surface 30 comprises initial sealing surface 30B of sealing insert 13 and primary sealing surface 30A of hardened insert 2. During operation of the valve assembly 20, valve body 3 moves cyclically relative to the reciprocating element/carrier 18/5 that is coupled with the hardened insert 2 and the sealing insert 13. In the closed configuration of the valve assembly 20, the valve body 3 contacts the primary sealing surface 30A of the hardened insert 2 and the initial sealing surface 30B of the sealing insert 13 to prevent fluid flow through the valve assembly 20. In the open configuration of the valve assembly 20, the valve body 3 does not contact the primary sealing surface 30A of the hardened insert 2 or the initial sealing surface 30B of the sealing insert 13 to allow fluid flow through the valve assembly 20. More specifically, in the closed configuration of the valve assembly 20, first portion $30C_1$ of the valve body sealing surface 30C contacts the primary sealing surface 30A of the hardened insert 2 and second portion $30C_2$ of the valve body sealing surface 30C contacts the initial sealing surface 30B of the sealing insert 13 to prevent fluid flow through the valve assembly 20. In the open configuration of the valve assembly 20, first portion $30C_1$ of the valve body sealing surface 30C does not contact the primary sealing surface 30A of the hardened insert 2 and second portion $30C_2$ of the valve body sealing surface 30C does not contact the initial sealing surface 30B of the sealing insert 13 to allow fluid flow through the valve assembly 20.

Figure 6:
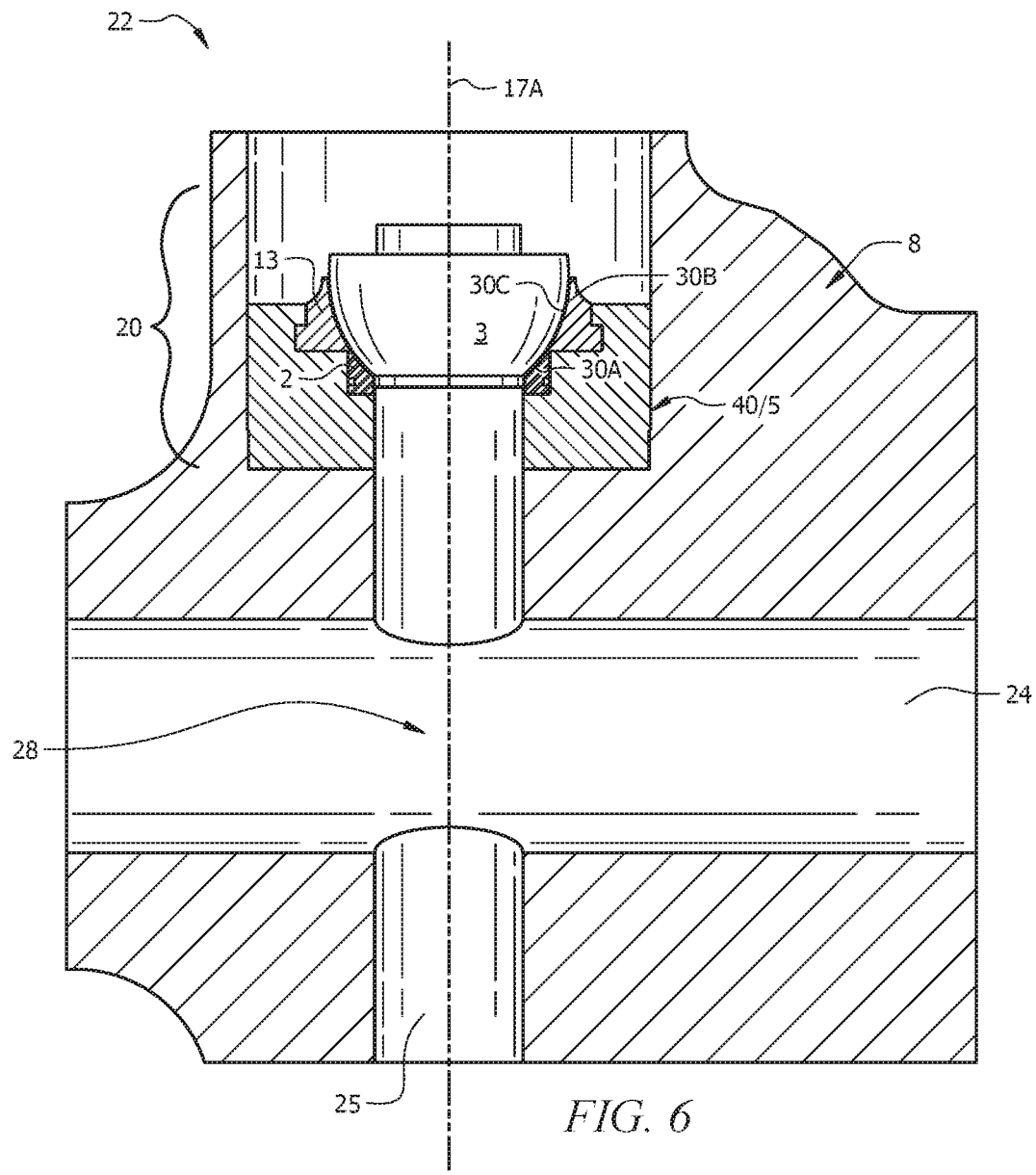
FIG. 6 is a schematic of a valve assembly of this disclosure, wherein the carrier is provided by a replaceable valve carrier.

As noted above, in embodiments, the carrier 5 comprises a replaceable valve carrier (RVC) 40. For example, with reference now to FIG. 6, a valve assembly 20 comprises valve body 3, and hardened insert 2 and sealing insert 13 coupled with carrier 5. In the embodiment of FIG. 6, carrier 5 is provided by RVC 40. Contact surface 30 comprises initial sealing surface 30B of sealing insert 13 and primary sealing surface 30A of hardened insert 2. During operation of the valve assembly 20, valve body 3 moves cyclically relative to the RVC 40/carrier 5 that is coupled with the hardened insert 2 and sealing insert 13. In the closed configuration of the valve assembly 20, the valve body 3 contacts the primary sealing surface 30A of the hardened insert 2 and the initial sealing surface 30B of the sealing insert 13 to prevent fluid flow through the valve assembly 20. In the open configuration of the valve assembly 20, the valve body 3 does not contact the primary sealing surface 30A of the hardened insert 2 or the initial sealing surface 30B of the sealing insert 13 to allow fluid flow through the valve assembly 20.

In embodiments in which the carrier 5 comprises a RVC 40, the RVC 40 is coupled with an inside surface 8A of a pump fluid end body 8 of the pump fluid end 22, and the hardened insert 2 and the sealing insert 13 are positioned about an inside surface 40A of the RVC 40. For example, as depicted in FIG. 6, RVC 40 can be interference fit, press fit, threaded, glued, or a combination thereof within pump fluid end body 8, such that an outside surface $S_o$ of the RVC 40 contacts an inside surface 8A of the pump fluid end body 8. The RVC 40 can be substantially larger in size than a conventional valve seat. For example, a surface area of the inside surface $S_i$ of the RVC 40 can be at least 5, 10, 15, 20, 25, 30, 35, 40, 45, 50% or more larger than the combined area of the initial sealing surface 30B and the primary sealing surface 30A.

RVC 40 can be operable as a slip fit carrier sealed into the pump fluid end 22 using, for example, O-rings or similar seals. In the event of a valve 3 failure, cavitation, hardened sealing surface (i.e., primary sealing surface 30A) failure, or the like that would otherwise damage a pump fluid end 22 absent RVC 40, damage can be limited to the RVC 40. In such an event, the RVC 40 can be removed and another RVC 40 inserted into the pump fluid end 22. In this manner, RVC 40 can also serve as a sacrificial replacement for a high wear section of pump fluid end 22, and be subjected to damage that would otherwise be inflicted on the (e.g., discharge portion of) the pump fluid end 22.

Figure 7:
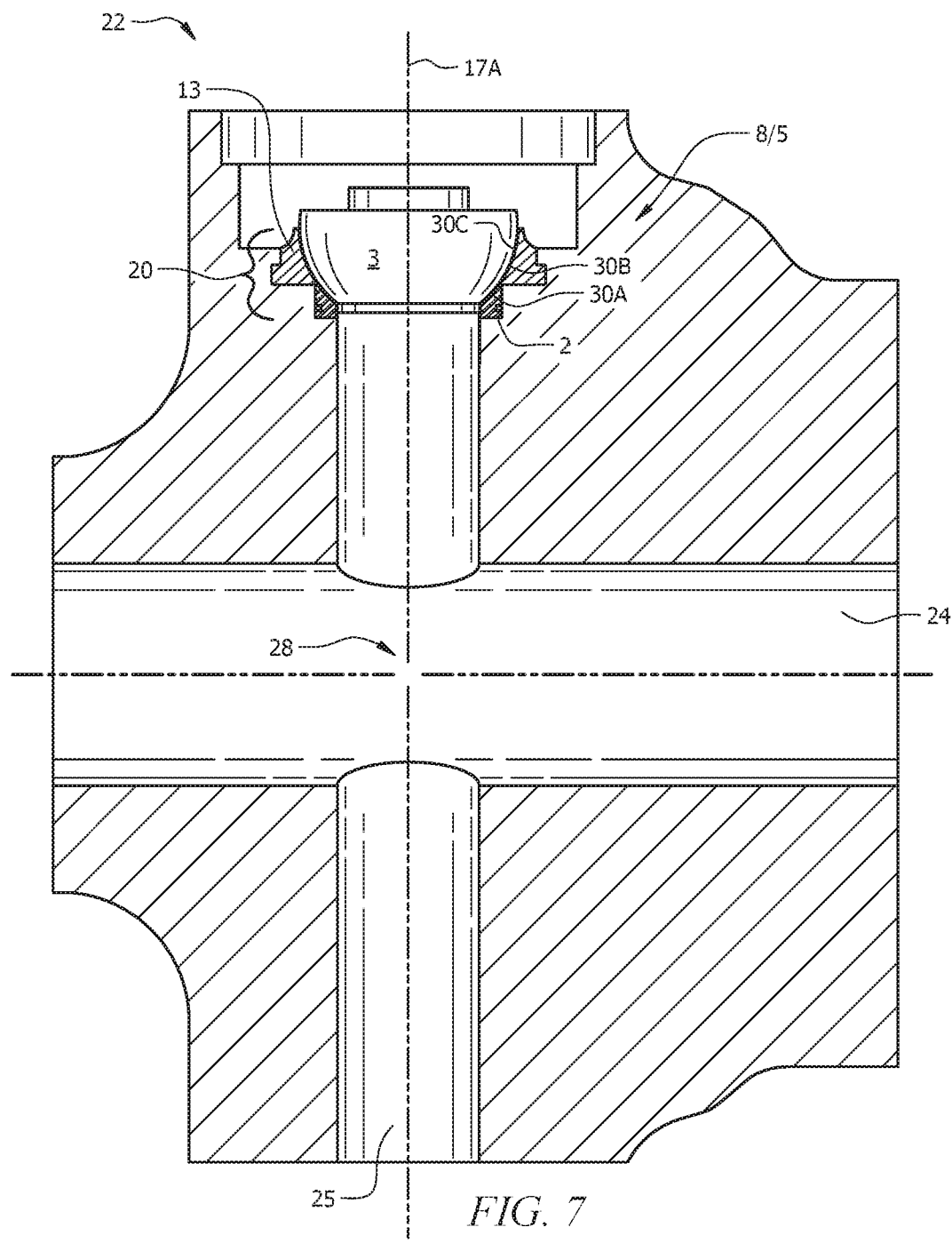
FIG. 7 is a schematic of a valve assembly of this disclosure, wherein the carrier is provided by a pump fluid end body.

As noted above, in embodiments, the carrier 5 comprises a pump fluid end body 8 of a pump fluid end 22 comprising the valve assembly 20. For example, with reference now to FIG. 7, a valve assembly 20 comprises valve body 3, and comprises hardened insert 2 and sealing insert 13 coupled with carrier 5. In the embodiment of FIG. 7, carrier 5 is provided by pump fluid end body 8. Contact surface 30 comprises initial sealing surface 30B of sealing insert 13 and primary sealing surface 30A of hardened insert 2. During operation of the valve assembly 20, valve body 3 moves cyclically relative to the contact surface 30 provided by the hardened insert 2 and sealing insert 13. In the closed configuration of the valve assembly 20, the valve body 3 contacts the primary sealing surface 30A of the hardened insert 2 and the initial sealing surface 30B of the sealing insert 13 to prevent fluid flow through the valve assembly 20. In the open configuration of the valve assembly 20, the valve body 3 does not contact the primary sealing surface 30A of the hardened insert 2 or the initial sealing surface 30B of the sealing insert 13 to allow fluid flow through the valve assembly 20.

The hardened insert 2 can be generally cylindrical. The hardened insert 2 can be positioned about an inside surface $S_i$ of the carrier 5, in embodiments. In alternative embodiments, hardened insert 2 is radially positioned between a first portion of inside surface $S_{i1}$ of the carrier 5 and an outside surface $S_o$ thereof. Hardened insert 2 and sealing insert 13 can be coupled with the carrier 5 about the inside surface $S_i$ thereof such that, in the open configuration, at least a portion of sealing insert 13 is axially closer to the valve body 3 than the hardened insert 2 along central axis 17A of the valve assembly 20. For example, in FIG. 5A, hardened insert 2 and sealing insert 13 are coupled with the carrier 5 about the inside surface $S_i$ thereof such that all of sealing insert 13 is axially closer to the valve body 3 than the hardened insert 2 along central axis 17A of the valve assembly 20. Alternatively, third portion $S_{i3}$ of inside surface $S_i$ of carrier 5 is shorter than outside surface 2C of hardened insert 2, such that hardened insert 2 and sealing insert 13 align radially a distance along central axis 17A of valve assembly 20. Hardened insert 2 and sealing insert 13 are a stationary hardened insert and a stationary sealing insert in that neither the hardened insert 2 nor the sealing insert 13 moves with valve body 3 during cyclic opening and closing of valve assembly 20.

For example, as depicted in FIG. 5A, hardened insert 2 can comprise a front surface 2A that provides primary sealing surface 30A, an inside surface 2B, an outside surface 2C, and a back surface 2D. As utilized with reference to components of valve assembly 20, "front" indicates proximate valve body 3, "back" indicates distal valve body 3, "inside" indicates proximate central axis 17A of valve assembly 20, and "outside" indicates distal central axis 17A of valve assembly 20.

Figure 8:
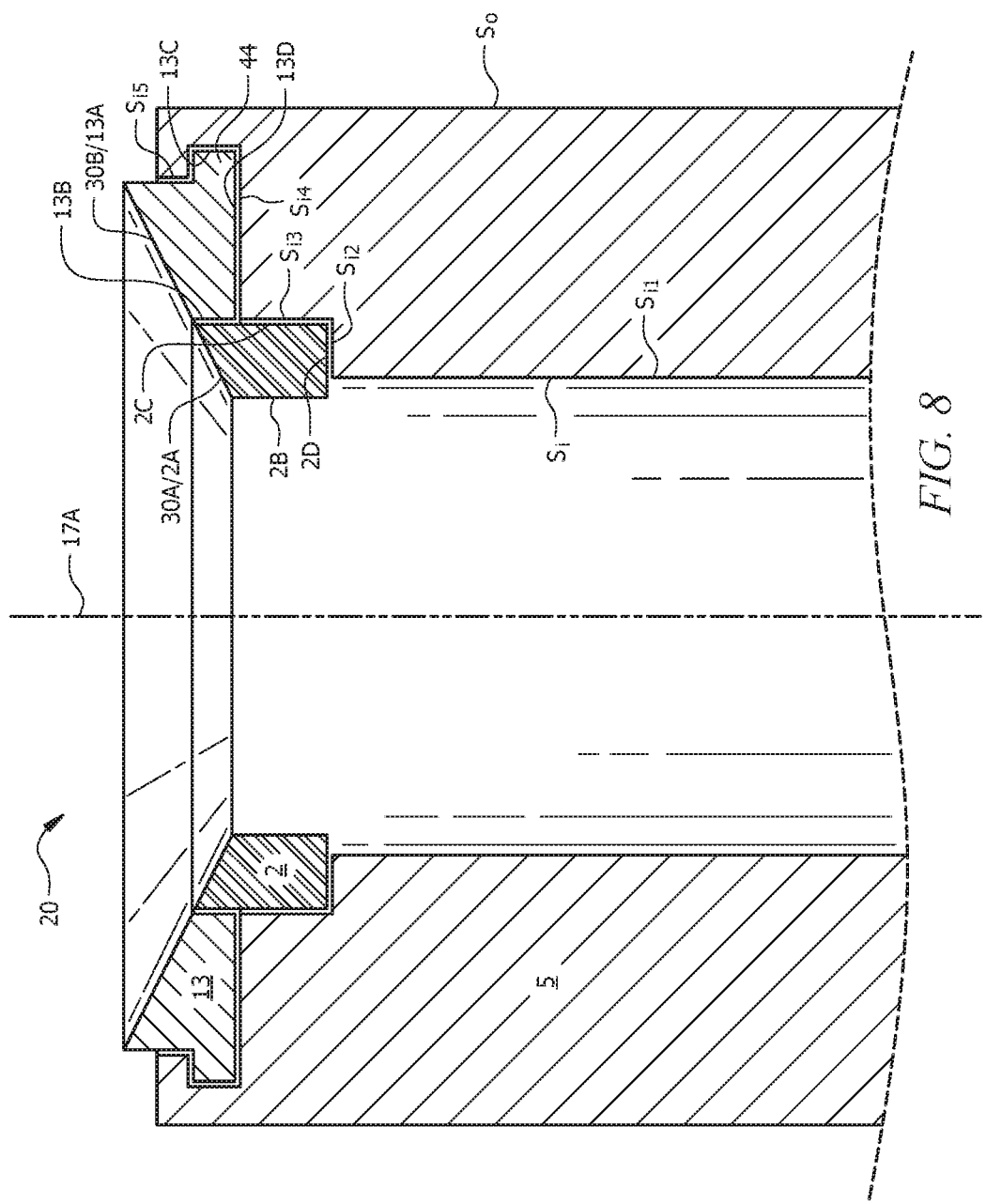
FIG. 8 is a schematic of another valve assembly, according to embodiments of this disclosure.

When hardened insert 2 is coupled with carrier 5, front surface 2A/primary sealing surface 30A of hardened insert 2 faces valve body 3. Front surface 2A and primary sealing surface 30B can have any shape complementary to first portion $30_{C1}$ of contact surface 30C of valve body 3. As depicted in FIGS. 5A-5D, FIG. 6, FIG. 7, and FIG. 9, inside surface 2A and primary sealing surface 30B of hardened insert 2 can have a frusto-spherical shape. Alternatively, as depicted in FIG. 8, which is a schematic of another valve assembly 20, according to embodiments of this disclosure, inside surface 2A and initial sealing surface 30B of hardened insert 2 can have a frusto-conical shape.

Figure 5B:
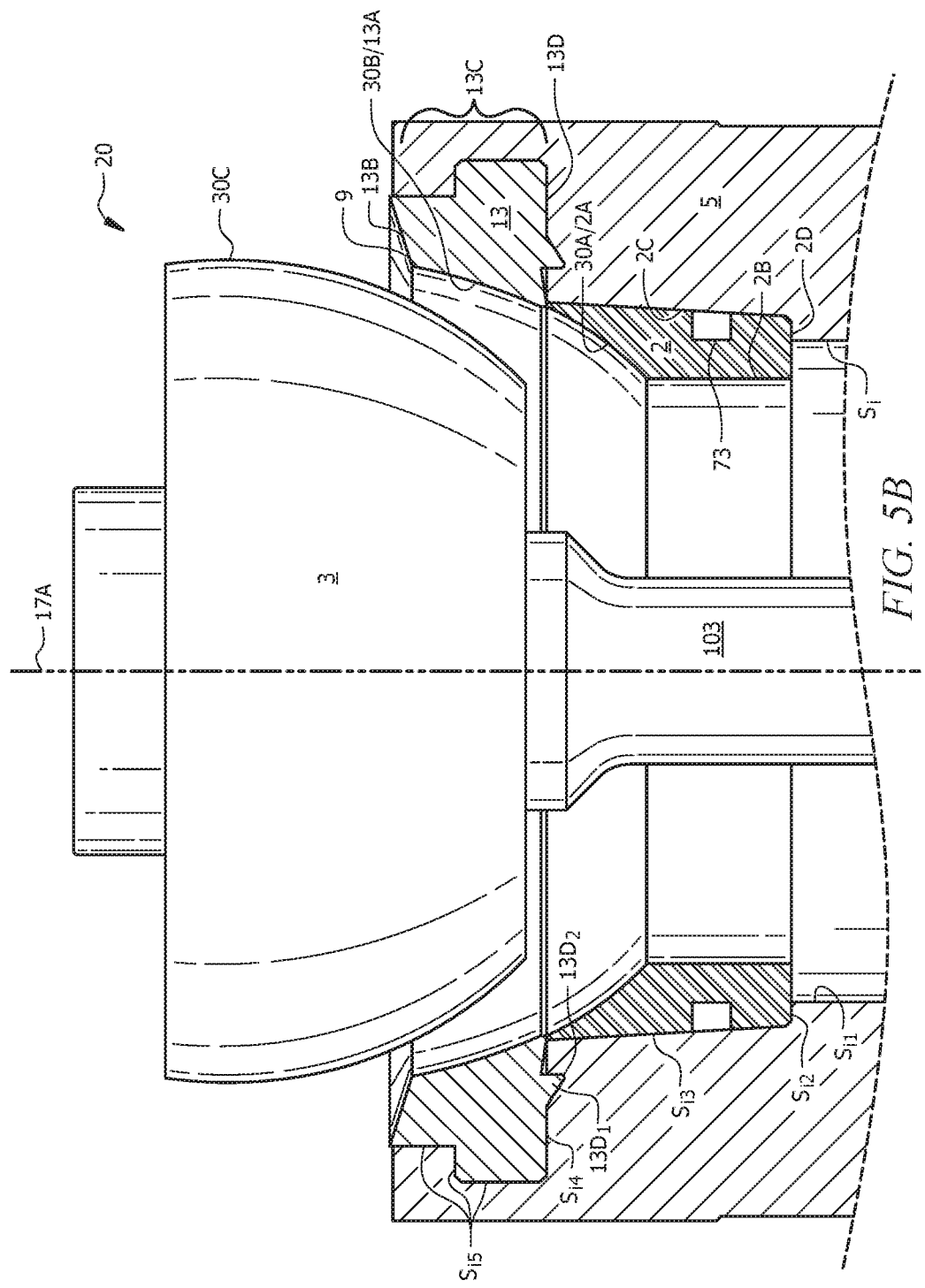
FIG. 5B is a schematic of another valve assembly, according to embodiments of the present disclosure, in an open configuration.
Figure 5C:
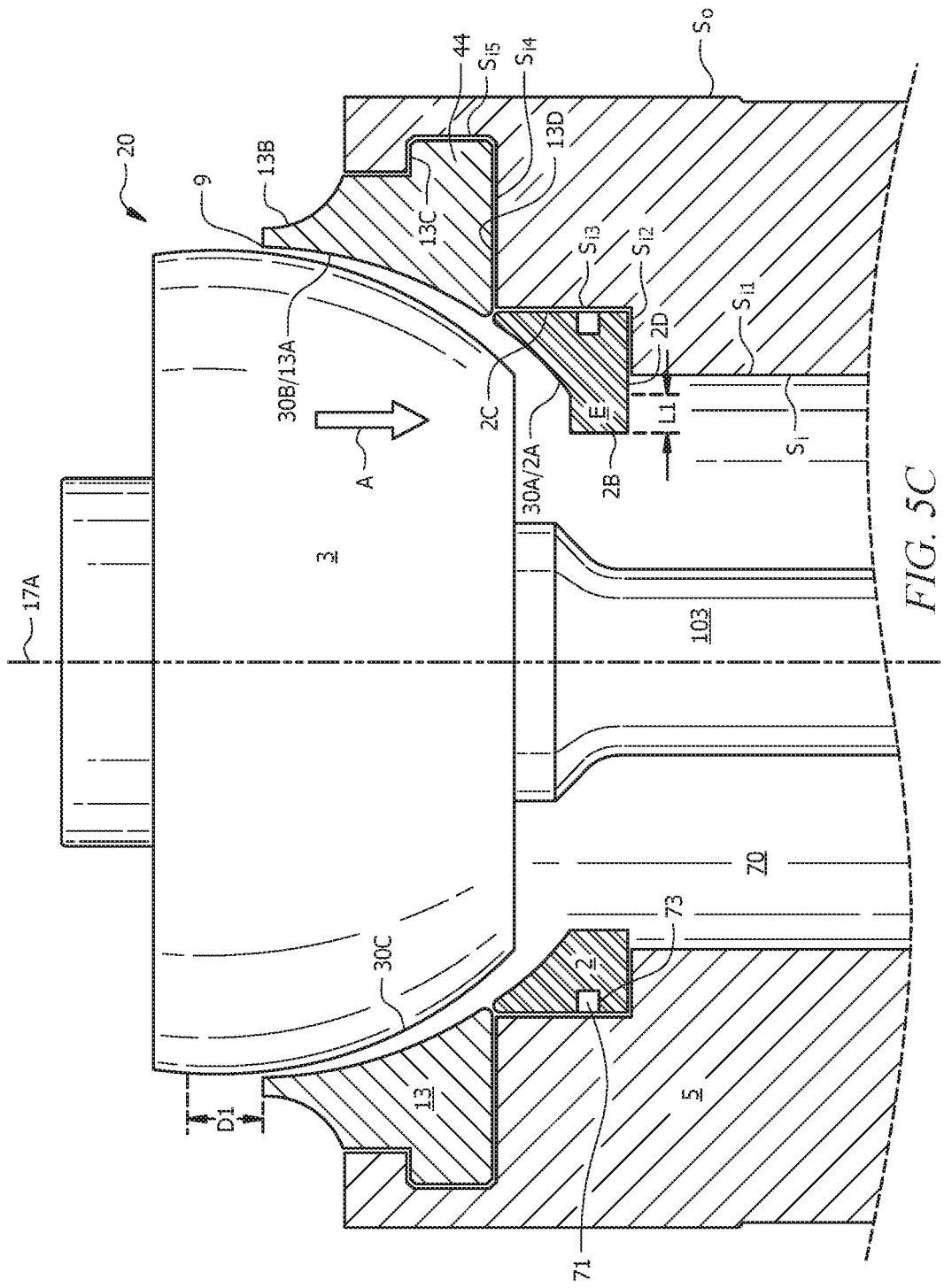
FIG. 5C is a schematic of another valve assembly according to embodiments of the present disclosure, during closing thereof, wherein the hardened insert comprises an extension.

When hardened insert 2 is coupled with carrier 5, inside surface 2B of hardened insert 2 can be substantially parallel to central axis 17A and can be flush with first portion $S_{i1}$ of carrier inside surface $S_i$, or extend an extension length L1 into flow bore 70, as depicted in FIG. 5C, which depicts another valve assembly 20 according to this disclosure and is discussed further hereinbelow. Outside surface 2C of hardened insert 2 can be substantially parallel to central axis 17A of valve assembly 20. A groove 73 can be positioned in outside surface 2C of hardened insert 2 for positioning of an insertion component between outside surface 2C of hardened insert 2 and third portion $S_{i3}$ of inside surface $S_i$ of carrier 5, to provide supplemental retention of hardened insert 2 therein. Such supplemental retention can be as described in U.S. patent application Ser. No. 16/411,898 filed May 14, 2019 and entitled "Pump Valve Seat With Supplemental Retention", the disclosure of which is hereby incorporated herein in its entirety for purposes not contrary to this disclosure. A corresponding groove can be located in third portion $S_{i3}$ of inside surface $S_i$ of carrier 5, in embodiments. Insertion element 71 can comprise, for example, a tab, a snap ring, an O-ring, a retaining ring, a pin, a staking component, or a combination thereof. Outside surface 2C of hardened insert 2 can extend axially a substantially same distance as third portion $S_{i3}$ of inside surface $S_i$ of carrier 5.

When hardened insert 2 is coupled with carrier 5, outside surface 2C of hardened insert 2 contacts third portion $S_{i3}$ of inside surface $S_i$ of carrier 5. Back surface 2D of hardened insert 2 can be substantially perpendicular to central axis 17A of valve assembly 20, or can be tapered, as depicted in FIG. 5B, which is a schematic of another valve assembly 20 of this disclosure, to provide a primary seal between hardened insert 2 and carrier 5. Such a tapered contact between back surface 2D of hardened insert 2 and third portion $S_{i3}$ of inside surface $S_i$ of carrier 5 is described, for example, as described in U.S. patent application Ser. No. 16/411,898 filed May 14, 2019, entitled "Pump Valve Seat with Supplemental Retention".

When hardened insert 2 is coupled with carrier 5, back surface 2D of hardened insert 2 contacts second portion $S_{i2}$ of inside surface $S_i$ of carrier 5 Generally, at least a portion of back surface 2D of hardened insert 2 has a complementary shape to that of second portion $S_{i2}$ of inside surface $S_i$ of carrier 5 and at least a portion of outside surface 2C of hardened insert 2 has a complementary shape to that of third portion $S_{i3}$ of inside surface $S_i$ of carrier 5, to provide contact therebetween and retention of hardened insert 2 in carrier 5.

The hardened insert 2 can be coupled with carrier 5 by any suitable methods known to those of skill in the art. For example, hardened insert 2 can be bonded in place, retained, as noted above, with a secondary sealing surface such as an o-ring and pressed in, pressed in, or placed via a thermal shrink fit. According to some embodiments, the hardened insert 2 may be attached to steel or metal portions of the carrier 5 in a number of ways. For example, the hardened insert 2 may be pressed, cast in place, shrunk via cold temperatures and put in place, friction welded, applied with a brazing solution, glued or bonded via some adhesive, chemically bonded, press fit, shrink fit, sintered, welded, or a combination thereof. In other examples, the hardened insert 2 is a coating applied by dipping or spraying. In embodiments, a tungsten carbide hardened insert 2 is secured by bonding, press-fitting, heating, cooling, shrinking, gluing, shrink-fitting, sintering, welding, or combinations thereof. Other shapes and coupling arrangements of hardened insert 2 and carrier 5 are within the scope of this disclosure.

As noted above, in operation, the hardened insert 2 operates to extend the life span of the valve assembly 20, which is subject to corrosion, erosion, or pitting during operation caused by the valve body 3 repetitively hitting the contact surface 30. Although depicted in FIGS. 5A-9 and described hereinabove as having a certain shape, it will be understood by those of skill in the art that hardened insert 2 can be formed in different shapes and sizes. The size, shape, and placement of the hardened insert 2 can depend on the operational environment. Hardened insert 2 can be sized, shaped, or placed based on areas of the valve assembly 20 that are subject to the most erosion or pitting. Likewise, variances in operational, ambient, or environmental temperatures, along with the operational forces applied to and/or otherwise acting on the hardened insert 2 (e.g., the tensile and compressive forces) may affect the size, shape or placement of the hardened insert 2.

As noted above, with reference to FIG. 5C, which is a schematic of a valve assembly 20 of this disclosure, hardened insert 2 can further comprise an extension E. The extension E extends a distance L1 in a direction perpendicular to the central axis 17A of the valve assembly 20. Extension E of hardened insert 2 extends farther toward central axis 17A of valve assembly 20 than an inside surface of the carrier 5 (e.g., an inside surface 18B of reciprocating element 18 when carrier 5 comprises reciprocating element 18, an inside surface 40A of RVC 40 when carrier 5 comprises RVC 40, or an inside surface 8A of pump fluid end body 8 when carrier 5 comprises pump fluid end body 8). The extension E of hardened insert 2 can be designed to retain another component of the valve assembly 20. For example, with reference to FIG. 9, which is described further hereinbelow, an extension E of hardened insert 2 can be designed to retain a valve spring 31, e.g., can serve as a seat for valve spring 31.

In embodiments, the primary sealing surface 30A of the hardened insert 2 is adjacent and substantially continuous with the initial sealing surface 30B of sealing insert 13, when hardened insert 2 and sealing insert 13 are coupled with carrier 5. Alternatively, the initial sealing surface 30B of the sealing insert 13 can be raised relative to the primary contact surface 30A of hardened insert 2.

As noted hereinabove, an amount of hardened material (e.g., carbide) in the hardened insert 2 can be less than an amount of hardened material (e.g., carbide) in a conventional valve seat in which the primary sealing surface 30A and the initial sealing surface 30B are provided by a valve seat made of the (e.g., same) hardened material (e.g., carbide). For example, in embodiments, an amount (e.g., a mass) of hardened material (e.g., carbide) in the hardened insert 2 is at least 40, 50, or 60% less than an amount (e.g., a mass) of the hardened material (e.g., carbide) in a conventional valve seat in which the primary sealing surface 30A and the initial sealing surface 30B are provided by a valve seat made of the hardened material (e.g., carbide).

The primary sealing surface 30A provided by the hardened insert 2 and the initial sealing surface 30B provided by the sealing insert 13 and/or the contact surface 30C of the valve body 3 can comprise disparate materials. A material of the primary sealing surface 30A provided by hardened insert 2 has a greater hardness than a material of the initial sealing surface 30B provided by sealing insert 13. A material of the primary sealing surface 30A can have a greater, substantially equivalent, or reduced hardness relative to a material of the valve body sealing surface 30C provided by valve body 3. For example, in embodiments, valve body 3 is made of a material having a greater, substantially equivalent, or reduced hardness relative to a material of which the hardened insert 2 is made. The hardened insert generally has a hardness greater than that of the carrier 5.

The hardnesses of the various components can be measured by the Vickers Hardness according to ASTM E92, the Rockwell or Vickers Hardness as measured by ASTM E18-19, and/or the Brinell Hardness as measured by ASTM E10-18. In embodiments, hardened insert 2 is a hardened insert as described in U.S. patent application Ser. No. 16/791,474 filed Feb. 14, 2020, which is entitled "Plunger or Piston with Hardened Insert", and the disclosure of which is hereby incorporated herein in its entirety for purposes not contrary to this disclosure. In such embodiments, hardened insert 2 is manufactured out of a "high-strength hardened material" (or simply a "hardened material"). Examples of high-strength hardened materials include, without limitation, zirconia, partially stabilized zirconia, tungsten carbide, tungsten carbide nickel, titanium, tungsten carbide cobalt, titanium carbide, silicon nitride, sialon, silicon, silicon nitride, ceramic, or other hardened material. Making a hardened insert 2 out of such materials can enable the herein disclosed valve assembly 20 to protect against conventional corrosion, pitting, and other wear-and-tear caused by the valve body 3 repetitively impacting the hardened insert 2, while minimizing an amount of hardened material utilized to provide the contact surface 30. Placing hardened insert 2 where constant valve friction occurs (i.e., utilizing hardened insert 2 to provide the primary sealing surface 30A) can extend the life of the valve assembly 20, and, by extension, the life of a pump 10 (e.g., a frac pump), while minimizing an amount of the hardened material utilized to provide the contact surface 30 (e.g., primary sealing surface 30A plus initial sealing surface 30B). As opposed to a conventional valve assembly comprising a valve seat, in which the entire contact surface (i.e., the contact surface between the valve body and the valve seat and the contact surface between a valve insert coupled with the valve body and the valve seat) are provided by a hardened material of the valve seat, a primary sealing surface 30A of the contact surface 30 of the valve assembly 20 of this disclosure is provided by hardened insert 2, while the initial sealing surface 30B of the sealing insert 13 of the valve assembly 20 of this disclosure is provided by a material having a reduced hardness relative to a hardness of the hardened insert 2.

The primary sealing surface 30A provided by the hardened insert 2 can comprise carbide. For example, in such embodiments, the hardened insert 2 can comprise a carbide ring. The carbide can comprise tungsten carbide. The hardness of the tungsten carbide may range from about 620-1076 HV, with reference to the Vickers hardness number.

Sealing insert 13 can be generally cylindrical. The sealing insert 13 is positioned about inside surface $S_i$ of the carrier 5. Without limitation, sealing insert 13 can comprise, for example, an elastomeric ring positioned on inside surface $S_i$ of carrier 5. As depicted in the embodiments of FIGS. 5A-9, sealing insert 13 can be radially distal (i.e., farther from) central axis 17A of valve assembly 20 along inside surface $S_i$ of carrier 5, relative to hardened insert 2. In alternative embodiments (not depicted), sealing insert 13 can be radially proximate (i.e., closer to) central axis 17A of valve assembly 20 along inside surface Si of carrier 5, relative to hardened insert 2. For example, as depicted in FIG. 5A, sealing insert 13 can comprise an inside surface 13A that provides initial sealing surface 30B, a front surface 13B, a back surface 13C, and an outside surface 13D.

With reference to FIG. 5A, sealing insert 13 comprises inside surface 13A that provides initial sealing surface 30B. When sealing insert 13 is coupled with carrier 5, inside/initial sealing surface 13A/30B of sealing insert 13 faces valve body 3. Inside surface 13A and initial sealing surface 30B can have any shape complementary to second portion $30C_2$ of contact surface 30C of valve body 3. As depicted in FIGS. 5A-5D, FIG. 6, FIG. 7, and FIG. 9, inside surface 13A and initial sealing surface 30B can have a frusto-spherical shape. Alternatively, as depicted in FIG. 8, inside surface 13A and initial sealing surface 30B of sealing insert 13 (as well as valve body 3 and/or valve body sealing surface 30C) can have a frusto-conical shape.

Front surface 13B of sealing insert 13 can have any suitable shape. In embodiments, such as depicted in FIG. 5A, FIG. 5C, FIG. 5D, FIG. 6, FIG. 7, and FIG. 9, front surface 13B of sealing insert 13 can be frusto-conical. Alternatively, as depicted in FIG. 5B and FIG. 8, front surface 13B of sealing insert 13 can be substantially linear, tapering outward from inside surface 13A to outside surface 13D of sealing insert 13. As depicted in FIG. 5A, FIG. 5C, FIG. 5D, FIG. 6, FIG. 7, and FIG. 8, front surface 13B can extend axially a greater distance than carrier 5, in embodiments. Alternatively, as depicted in FIG. 5B, front surface 13B can extend axially a substantially same distance as carrier 5.

Outside surface 13C of sealing insert 13 contacts fifth portion $S_{i5}$ of inside surface $S_i$ of carrier 5 when sealing insert 13 is coupled with carrier 5. Outside surface 13C of sealing insert 13 can comprise an L-shaped lip 44. When sealing insert 13 is coupled with carrier 5, L-shaped lip 44 contacts L-shaped fifth portion $S_{i5}$ of inside surface $S_i$ of carrier 5.

Back surface 13D of sealing insert 13 can be substantially perpendicular to central axis 17A of valve assembly 20, as depicted in FIG. 5A, FIG. 5C, FIG. 5D, and FIG. 6-FIG. 8, or can be tapered to provide a primary seal between sealing insert 13 and carrier 5. As depicted in FIG. 5B, back surface 13D can comprise a protrusion $13D_1$ that fits into a complementarily shaped indention $13D_2$ of fourth portion $S_{i4}$ of inside surface $S_i$ of carrier 5. Other shapes of protrusion $13D_1$ and indention $13D_2$ are possible, and within the scope of this disclosure.

Generally, a portion of back surface 13D of sealing insert 13 has a complementary shape to that of fourth portion $S_{i4}$ of inside surface $S_i$ of carrier 5 and outside surface 13C of sealing insert 13 has a complementary shape to that of fifth portion $S_{i5}$ of inside surface $S_i$ of carrier 5, to provide contact therebetween and retention of sealing insert 13 in carrier 5.

The sealing insert 13 can be coupled with carrier 5 by any suitable methods known to those of skill in the art. For example, sealing insert 13 can be bonded in place, retained with a secondary sealing surface such as an o-ring and pressed in, pressed in, or placed via a thermal shrink fit. According to some embodiments, the sealing insert 13 may be attached to steel or metal portions of the carrier 5 in a number of ways. For example, the sealing insert 13 may be pressed, cast in place, shrunk via cold temperatures and put in place, friction welded, applied with a brazing solution, glued or bonded via some adhesive, chemically bonded, press fit, shrink fit, sintered, welded, or a combination thereof. In embodiments, a sealing insert 13 is secured by bonding, press-fitting, heating, cooling, shrinking, gluing, shrink-fitting, sintering, welding, or combinations thereof.

As depicted in FIGS. 5A-FIG. 5D, and FIG. 6-FIG. 9, sealing insert 13 can have an L-L-shaped shaped outside surface 13C that fits into a complementarily L-shaped fifth portion $S_{i5}$ of inside surface $S_i$ of carrier 5. Other shapes and coupling arrangements of sealing insert 13 and carrier 5 are within the scope of this disclosure. Sealing insert 13 can be press fit, interference fit, or otherwise positioned into carrier 5 for coupling therewith. For example, in embodiments, sealing insert 13 can be molded in place in the carrier 5. In other embodiments, the sealing insert 13 is preformed and then attached to the carrier 5.

Sealing insert 13 operates to provide an initial seal between sealing element 13 and valve body 3 during closing of valve assembly 20. Although depicted in FIGS. 5A-9 and described hereinabove as having a certain shape, it will be understood by those of skill in the art that sealing insert 13 can be formed in different shapes and sizes. The size, shape, and placement of the sealing insert 13 can depend on the operational environment. Variances in operational, ambient, or environmental temperatures, along with the operational forces applied to and/or otherwise acting on the sealing insert 13 (e.g., the tensile and compressive forces) may affect the size, shape or placement of the sealing insert 13.

Figure 5D:
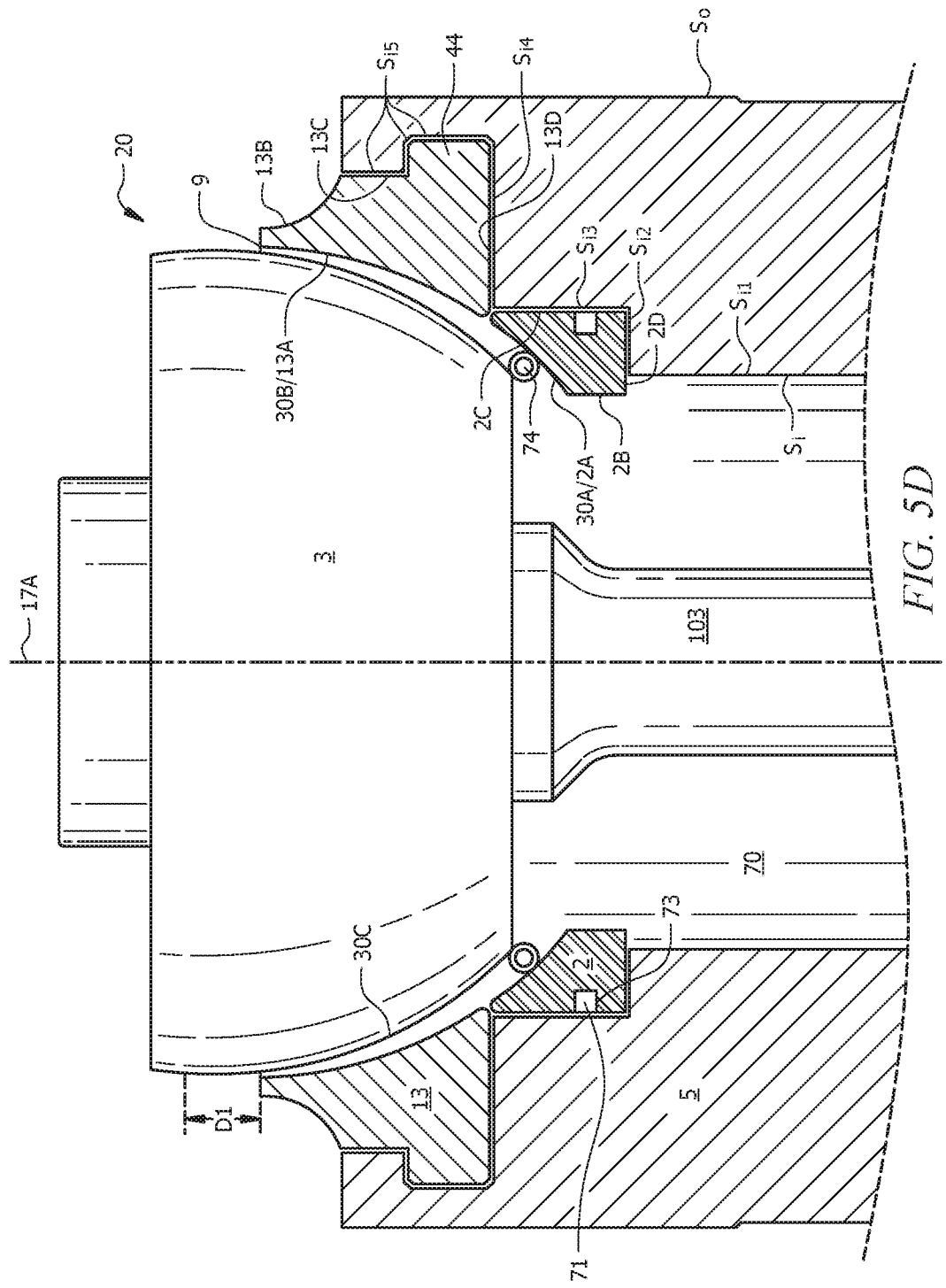
FIG. 5D is a schematic of the valve assembly of FIG. 5A, during closing thereof, having a particulate between the valve body and the hardened insert.

Sealing insert 13 can further comprise an initial contact or "sealing lip" 9. The sealing lip 9 can serve to "wipe" the valve body 3 during closing of the valve assembly 20. As depicted in FIG. 5C, during closing of valve assembly 20, as valve body 3 moves relatively toward carrier 5 as indicated by arrow A, initial contact 9 first contacts valve body 3. As valve assembly 20 continues to close and valve body 3 approaches carrier 5, initial contact 9 wipes clean the valve body sealing surface 30C and initiates the seal between the valve body sealing surface 30C and the contact surface 30 provided by the hardened insert 2 and sealing insert 13. As depicted in FIG. 5D, which is a schematic of the valve assembly of FIG. 5A having a particulate 74 captured between the valve body 3 and the hardened insert 2 during closing thereof, should a (e.g., large) particulate 71 be captured between the metal-to-metal seal between the hardened insert 2 and the valve body 3 (i.e., between the valve body sealing surface 30C and the primary sealing surface 30A), sealing insert 13 is in contact with valve body sealing surface 30C (i.e., initial sealing surface 30B is in contact with valve body sealing surface 30C) and initiates a seal, which forces closure of the valve assembly 20.

As noted hereinabove, the initial sealing surface 30B of sealing insert 13 can be substantially continuous with the primary sealing surface 30A of the hardened insert 2, when hardened insert 2 and sealing insert 13 are coupled with carrier 5. Alternatively, the initial sealing surface 30B of the sealing insert 13 can be raised relative to the primary contact surface 30A of hardened insert 2.

Generally, sealing insert 3B comprise a material, such as an elastomer, that can deform about particulates (e.g., being pumped by a pump 10 comprising the valve assembly 20) during formation of the primary seal provided by contact of the primary sealing surface 30A and contact surface 30C of valve body 3. Sealing insert 13 is designed to provide an initial seal via contact of the initial sealing surface 30B of sealing insert 13 and the contact surface 30C of valve body 3, during closing of the valve assembly 20. As depicted in FIGS. 5A-FIG. 5D, and FIGS. 6-7, contact surface 30 can extend axially such that, in the closed configuration of valve assembly 20, contact surface 30 extends axially in a direction away from carrier 5 to a lesser extent than valve body sealing surface 30C. That is, in the closed configuration of valve assembly 20, valve body sealing surface 30C can extend axially a distance D1 in a direction away from carrier 5 more than contact surface 30 extends axially. Alternatively, contact surface 30 can extend axially such that, in the closed configuration of valve assembly 20, contact surface 30 extends axially in a direction away from carrier 5 to a substantially equal or greater extent than valve body sealing surface 30C extends axially in the direction away from carrier 5.

According to some examples, sealing insert 13 is composed of one or more materials such as, for example, a deformable thermoplastic material, a urethane material, a fiber-reinforced material, carbon, glass, cotton, wire fibers, cloth, and/or any combination thereof. In other embodiments, sealing insert 13 comprises a cloth, which is disposed in a thermoplastic material. The cloth can include carbon, glass, wire, cotton fibers, and/or any combination thereof. In embodiments, sealing insert 13 comprises a fiber-reinforced material, which can prevent or at least reduce delamination. In embodiments, the sealing insert 13 has a hardness of 95 A durometer or greater, or a hardness of 69 D durometer or greater based on the Rockwall Hardness scale. In embodiments, valve body 3, hardened insert 2, and/or carrier 5 is harder and more rigid than sealing insert 13.

Carrier 5, which can have a hardness less than the hardness of the primary sealing surface 30A and/or hardened insert 2, can comprise any suitable material. For example and without limitation, the carrier 5 can comprise steel, such as carburized steel. The inside surface $S_i$ of carrier 5 can comprise the same or a different material from the remainder of the carrier 5. For example, a reciprocating element (e.g., plunger or piston) 18, RVC 40, or pump fluid end body 8 can comprise steel, and the inside surface $S_i$ thereof can comprise carburized steel.

The steel of the carrier 5 (and/or valve body 3) may include, for example, stainless steel, low-carbon steel (e.g., with less than 0.3% carbon); medium-carbon steel (e.g., 0.3-0.6% carbon); high-carbon steel (e.g., more than 0.6% carbon); alloy steels, (e.g., manganese, silicon, nickel, titanium, copper, chromium, aluminum, and the like) or any other type of steel and/or metal.

The valve body 3 can be any suitable valve known in the art. For example, as noted hereinabove valve body 3 can comprise a movable valve poppet, and can be wing guided and/or stem guided, or a combination thereof. For example, in embodiments, valve 3 comprises a valve poppet, as described, for example, in U.S. patent application Ser. No. 16/436,356 filed Jun. 10, 2019, which is entitled "Multi-Material Frac Valve Poppet", the disclosure of which is hereby incorporated herein in its entirety for purposes not contrary to this disclosure. In such applications, the valve seat of the valve poppet assembly is replaced with the contact surface 30 provided by hardened insert 2 and sealing insert 13, as described herein.

As with primary sealing surface 30A, initial sealing surface 30B, and/or contact surface 30 (comprising primary sealing surface 30A and initial sealing surface 30B), the valve body sealing surface 30C and/or the valve body 3 can have a frusto-spherical shape. Such a frusto-spherically shaped valve body 3 and valve body sealing surface 30C are depicted in FIGS. 5A-5D, FIG. 6, FIG. 7, and FIG. 9. Alternatively, valve body sealing surface 30C and/or valve body 3 can have can other shapes, which other shapes are within the scope of this disclosure. For example, as depicted in FIG. 8, the valve body sealing surface 30C and/or the valve body 3 can have a frusto-conical shape.

Figure 9:
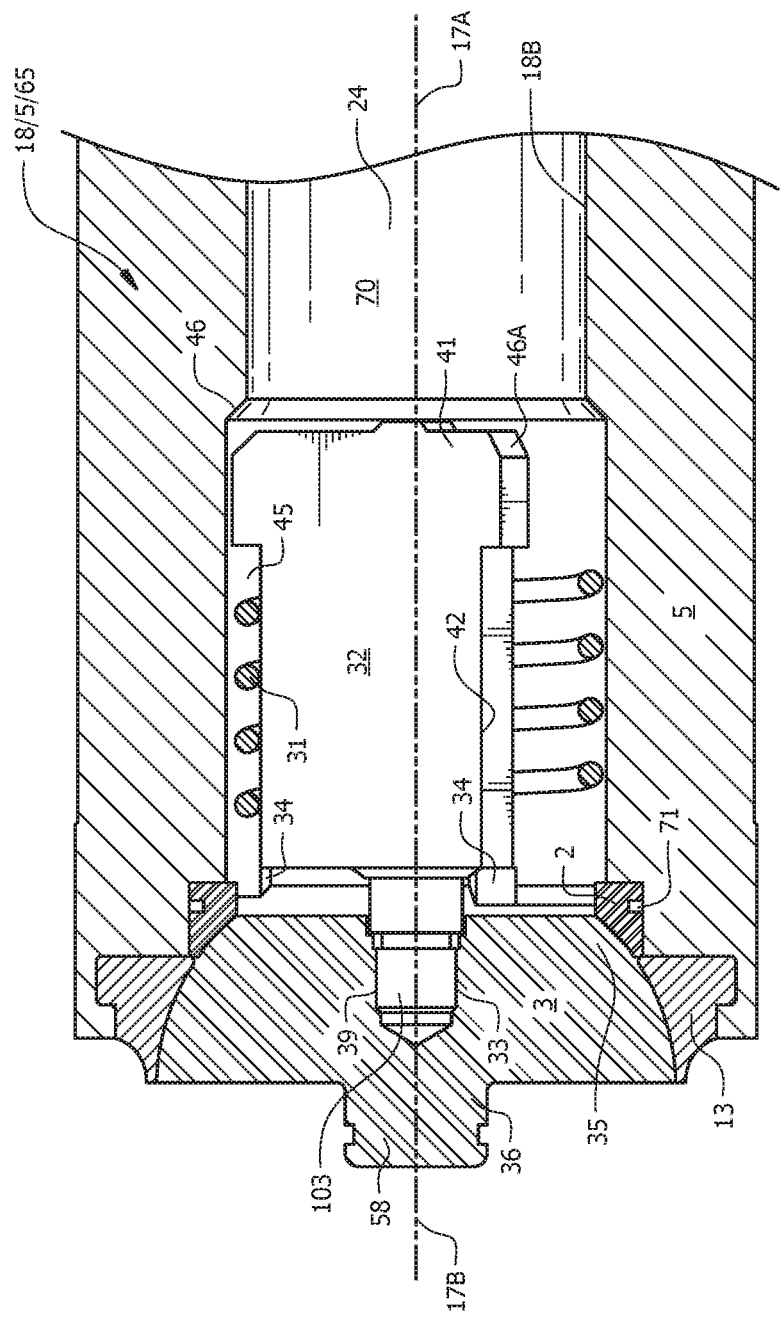
FIG. 9 is a schematic of another valve assembly, according to embodiments of the present disclosure.

Valve body 3 can be generally cylindrical. With reference to FIG. 9, which is a schematic of another valve assembly 20 of this disclosure, valve body 3 comprises a first side 35 opposite (e.g., axially distal from) a second side 36. The first side 35 of valve body 3 comprises the valve body sealing surface 30C that contacts the primary sealing surface 30A of the hardened insert 2 and the initial sealing surface 30B when the valve assembly 20 is in a (e.g., normally) closed position. As noted hereinbelow with reference to FIG. 9, the second side 36 of valve body 3 can comprise a coupler actuating feature 58.

Valve body 3 can comprise a metal. By way of examples, the valve body 3 can comprise carbide, or steel. As described above for the carrier 5, the steel can include, for example, stainless steel, low-carbon steel (e.g., with less than 0.3% carbon); medium-carbon steel (e.g., 0.3-0.6% carbon); high-carbon steel (e.g., more than 0.6% carbon); alloy steels, (e.g., manganese, silicon, nickel, titanium, copper, chromium, aluminum, and the like) or any other type of steel and/or metal.

Valve assembly 20 can comprise additional components. For example, as described further hereinbelow with reference to FIG. 9, valve assembly 20 can further comprise a spring 31 operable as a biasing component, and a valve guide 32 operable to maintain alignment of valve 3 within a housing 65 (e.g., reciprocating element bore 24, chamber 28, or bore 25) of pump fluid end 22. As noted hereinabove and depicted in FIGS. 5C and 9, hardened insert 2 can serve as a seating surface for valve spring 31, and/or valve spring 31 can be disposed about valve guide 32. Alternatively, valve spring 31 can be positioned on an opposite side of valve body 3 from valve guide 32 and seated on another component of pump fluid end 22.

As noted above, the valve assembly 20 can further comprise a valve guide 32. The valve guide can be coupled with the valve body 3 via a valve stem 103 and configured to align the valve body 3 within the valve assembly 20. Such a valve guide is described, for example, in U.S. patent application Ser. No. 16/411,910 filed May 14, 2019, which is entitled "Valve Assembly for a Fluid End with Limited Access", the disclosure of which is hereby incorporated herein in its entirety for purposes not contrary to this disclosure. For example, as depicted in FIG. 9, valve assembly 20 can further comprise a valve guide 32 comprising a plurality of wings or fins 42. When assembled, each of the plurality of wings 42 is aligned with one of a plurality of grooves 34 of an inside surface of a housing 65 that provides flow bore 70 (e.g., an inside surface 18B of a reciprocating element 18 that provides reciprocating element flow bore 24), such that, during operation, the plurality of wings 42 can slide along the plurality of grooves 34, and rotation of the valve guide 32 about central axis 17A of valve assembly 20 is restricted. In an embodiment, a number of grooves 34 is equal to a number of wings 42. In alternative embodiments, a valve assembly 20 comprises a greater or lesser number of grooves 34 than wings 42. In embodiments, valve assembly 20 comprises three grooves 34 and three wings 42, spaced at 120 degrees to form a 360 degree circumference. The plurality of circumferentially-spaced wings 42 angularly extending from the valve body 3 to slidably engage the inside surface of the housing 65. In FIG. 5A-FIG. 8, the valve body 3 is engaged and otherwise biased by a spring 31, which biases the valve body 3 to a closed position, to prevent fluid flow. Other examples do not include springs.

Valve guide 32 can comprise a coupler 39. Valve guide 32 can be coupled to or decoupled from a first side 35 of the valve body 3 via the coupler 39 by actuating the coupler actuating feature 58 of valve body 3 on second side 36 of the valve body 3. Coupler 39 can comprise a threaded portion of the valve guide 32, which engages complimentary threads located in a threaded hole or recess 33 located on the first side 35 of the valve body 3. Alternatively, coupler 39 can comprise a twist lock coupler 39. Valve guide 32 can further comprise a valve guide end 41 distal the coupler 39. When the valve guide 32 is coupled to the valve body 3 via the coupler 39, the valve guide end 41 of the valve guide 32 distal the coupler 39 extends a greater radial distance from the central axis of the valve body 3 (which, upon assembly, is coincident with (also referred to as coaxial with) the central axis 17A of valve assembly 20) than the plurality of wings 42. As depicted in FIG. 9, the valve guide end 41 of the valve guide 32 distal the coupler 39 extends radially a distance E2 from central axis 17A, which is a greater radial distance from the central axis 17A than a distance E1 from central axis 17A that wings 40 radially extend. When valve assembly 20 is in an assembled configuration, valve body 3 is coupled to valve guide 32 via coupler 39, the plurality of wings 42 of the valve guide 32 are aligned with the plurality of grooves 34, and a valve spring 31 is positioned in an annular space 45 extending an axial distance D2 between housing 65 and valve guide end 41 of valve guide 32 distal coupler 39 (e.g., the wings 42 of the valve guide 32 are positioned inside coil or helical valve spring 31, typically a compression coil spring). Valve guide 32 (e.g., valve guide end 41) can rest on shoulder 46 of housing 65, with at least a portion of corresponding portion 46A of valve guide end 41 corresponding to shoulder 46 contacting shoulder 46.

Hardened insert 2, valve body 3, sealing insert 13, inside surface $S_i$ of carrier 5, or a combination thereof can have alternative shapes from those depicted in the Figures. The valve assembly 20 can be horizontally positioned such that central axis 17A of the valve assembly 20 is horizontal, or vertically positioned such that the central axis 17A of the valve assembly 20 is vertical.

Also disclosed herein is a pump fluid end 22 comprising: a reciprocating element 18 at least partially within a reciprocating element bore 24 of the pump fluid end 22, wherein the reciprocating element bore 24 extends into the pump fluid end 22 from an end (e.g., back end S2) of the pump fluid end 22 and has a central axis 17; a suction valve assembly 56; and a discharge valve assembly 72. According to this disclosure, the suction valve assembly 56, the discharge valve assembly 72, or both the suction valve assembly 56 and the discharge valve assembly 72 comprise a valve assembly 20 comprising a valve body 3; a hardened insert 2; a sealing insert; and a carrier 5, wherein the hardened insert 2 is cylindrical and comprises a primary sealing surface 30A, wherein the sealing insert 13 is cylindrical and comprises an initial sealing surface 30B, wherein the carrier 5 has an inside surface $S_i$, wherein the hardened insert 2 and the sealing insert 13 are coupled to the carrier 5, and wherein, in a closed configuration of the valve assembly 20, the valve body 3 contacts the primary sealing surface 30A of the hardened insert 2 and the initial sealing surface 30B of the sealing insert 13 to prevent fluid flow, and wherein, in an open configuration, the valve body 3 is separated from the primary sealing surface 30A of the hardened insert 2 and the initial sealing surface 30B of the sealing insert 13 to allow fluid flow.

The pump fluid end 22 can be a concentric bore pump fluid end 22 (e.g., a concentric bore pump fluid end 22, as described hereinabove with reference to FIG. 3) or a cross bore (e.g., an x-bore pump fluid end 22, as described hereinabove with reference to FIG. 2A or a T-bore pump fluid end 22, as described with reference to FIG. 2B) pump fluid end 22.

As described with reference to FIG. 3, the pump fluid end 22 can be a concentric bore pump fluid end 22. As depicted in FIG. 5A, in some such embodiments, the suction valve assembly 56 comprises the valve assembly 20 of this disclosure, and the carrier 5 of the valve assembly 20/suction valve assembly 56 comprises the reciprocating element 18. In such embodiments, the discharge valve assembly 72 may or may not be a valve assembly 20 as described herein.

In embodiments, the pump fluid end 22 is a concentric bore pump fluid end 22, as described with reference to FIG. 3, the discharge valve assembly 72 comprises the valve assembly 20 of this disclosure, and the carrier 5 of the valve assembly 20/discharge valve assembly 72 comprises the RVC 40 or pump fluid end body 8. In such embodiments, the suction valve assembly 56 may or may not be a valve assembly 20 as described herein.

In embodiments, the pump fluid end is a cross-bore pump fluid end 22, and the discharge valve assembly 72, the suction valve assembly 56, or both the discharge valve assembly 72 and the suction valve assembly 56 comprise a valve assembly 20 of this disclosure. In some such cross-bore pump fluid end 22 embodiments, the pump fluid end 22 is a tee-bore pump fluid end 22, as described hereinabove with reference to FIG. 2B, the discharge valve assembly 72 comprises a valve assembly 20 of this disclosure, and the carrier 5 of the valve assembly 20/discharge valve assembly 72 comprises the RVC 40 or pump fluid end body 8. In such embodiments, the suction valve assembly 56 may or may not be a valve assembly 20 as disclosed herein, wherein the carrier 5 of the valve assembly 20/suction valve assembly 56 comprises the reciprocating element 18. In some such cross-bore pump fluid end 22 embodiments, the pump fluid end 22 is a tee-bore pump fluid end 22, as described hereinabove with reference to FIG. 2B, the suction valve assembly 56 comprises a valve assembly 20 of this disclosure, and the carrier 5 of the valve assembly 20/suction valve assembly 56 comprises the reciprocating element 18. In such embodiments, the discharge valve assembly 72 may or may not be a valve assembly 20 as disclosed herein, wherein the carrier 5 of the valve assembly 20/discharge valve assembly 72 comprises the RVC 40 or pump fluid end body 8.

In some cross-bore pump fluid end 22 embodiments, the pump fluid end 22 is an x-bore pump fluid end 22, as described hereinabove with reference to FIG. 2A, the discharge valve assembly 72 comprises a valve assembly 20 of this disclosure, and the carrier 5 of the valve assembly 20/discharge valve assembly 72 comprises the RVC 40 or pump fluid end body 8. In such embodiments, the suction valve assembly 56 may or may not be a valve assembly 20 as disclosed herein. In other such cross-bore pump fluid end 22 embodiments, the pump fluid end 22 is an x-bore pump fluid end 22, as described hereinabove with reference to FIG. 2A, the suction valve assembly 56 comprises a valve assembly 20 of this disclosure, and the carrier 5 of the valve assembly 20/suction valve assembly 56 comprises the RVC 40 or pump fluid end body 8. In such embodiments, the discharge valve assembly 72 may or may not be a valve assembly 20 as disclosed herein.

For example, FIG. 6 depicts the valve assembly 20 as a discharge valve assembly 72 in a cross-bore pump fluid end 22, and FIG. 7 depicts the valve assembly 20 as a discharge valve assembly 72 in a cross-bore pump fluid end 22.

Also disclosed herein is a pump 10 comprising a pump fluid end 22 of this disclosure comprising the valve assembly 20 as described herein. The pump of this disclosure comprises a pump power end 12 (e.g., as described with reference to FIG. 3, hereinabove) and the pump fluid end 22 comprising the valve assembly 20 of this disclosure. The pump power end 12 is operable to reciprocate reciprocating element 18 within reciprocating element bore 24 of the pump fluid end 22. As described hereinabove, the pump fluid end 22 comprises: the reciprocating element 18 at least partially within reciprocating element bore 24 of the pump fluid end 22, wherein the reciprocating element bore 24 extends into pump fluid end 22 from an end (e.g., back end S2) of pump fluid end 22 and has a central axis 17, a suction valve assembly 56, a discharge valve assembly 72. The suction valve assembly 56, the discharge valve assembly 72, or both the suction valve assembly 56 and the discharge valve assembly 72 comprise a valve assembly 20 of this disclosure comprising hardened insert 2, valve body 3, and sealing insert 13, and carrier 5, wherein a hardened insert 2, wherein the hardened insert 2 is cylindrical and comprises a primary sealing surface 30A, wherein the sealing insert 13 is cylindrical and comprises an initial sealing surface 30B, wherein the carrier 5 has an inside surface $S_i$, wherein the hardened insert 2 and the sealing insert 13 are coupled to the carriers along inside surface $S_i$ thereof, wherein, in a closed configuration of the valve assembly 20, the valve body 3 contacts the primary sealing surface 30A of the hardened insert 2 and the initial sealing surface 30B of the sealing insert 13 to prevent fluid flow through the valve assembly 20, and wherein, in an open configuration of the valve assembly 20, the valve body 3 is separated from the primary sealing surface 30A of the hardened insert 2 and the initial sealing surface 30B of the sealing insert 13 to allow fluid flow through the valve assembly 20.

A pump 10 of this disclosure can be a multiplex pump comprising a plurality of reciprocating assemblies (e.g., reciprocating elements 18, and a corresponding plurality of reciprocating element bores 24, suction valve assemblies 56, and discharge valve assemblies 72). The plurality can comprise any number such as, for example, 2, 3, 4, 5, 6, 7, or more. For example, in embodiments, pump 10 is a triplex pump, wherein the plurality comprises three. In alternative embodiments, pump 10 comprises a Quintuplex pump, wherein the plurality comprises five.

Figure 10:
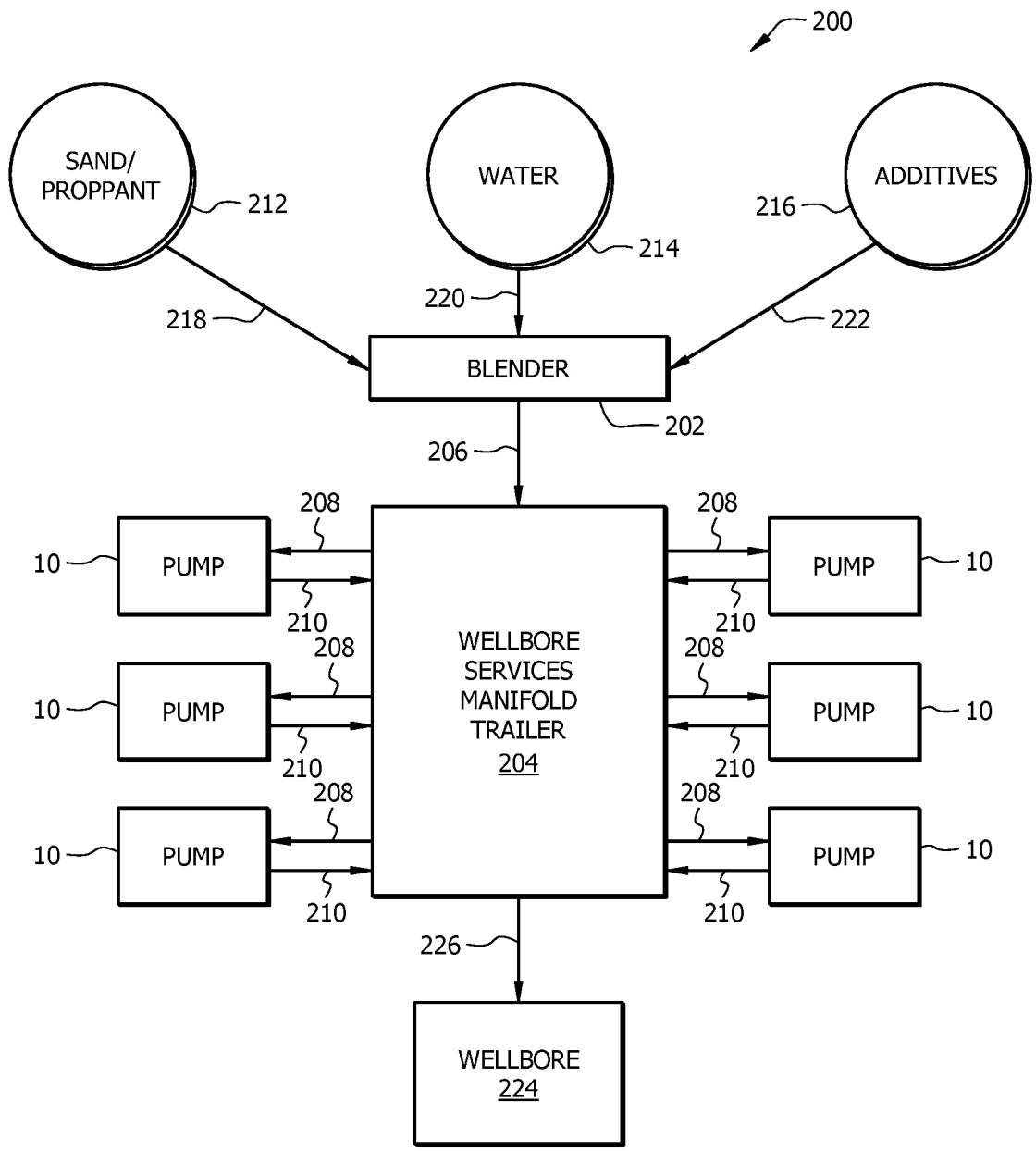
FIG. 10 is a schematic representation of an embodiment of a wellbore servicing system, according to embodiments of this disclosure.

Also disclosed herein are a method of servicing a wellbore and a wellbore servicing system 200 comprising a pump of this disclosure. An embodiment of a wellbore servicing system 200 and a method of servicing a wellbore via the wellbore servicing system 200 will now be described with reference to FIG. 10, which is a schematic representation of an embodiment of a wellbore servicing system 200, according to embodiments of this disclosure.

A method of servicing a wellbore 224 according to this disclosure comprises: fluidly coupling a pump 10 to a source of a wellbore servicing fluid and to the wellbore 224; and communicating wellbore servicing fluid into a formation in fluid communication with the wellbore 224 via the pump 10.

As detailed further hereinabove, the pump 10 of this disclosure comprises a pump fluid end 12 and a pump power end 22. The pump power end 12 is operable to reciprocate reciprocating element 18 within reciprocating element bore 24 of pump fluid end 22. The pump fluid end 22 comprises: reciprocating element 18 at least partially within reciprocating element bore 24 of the pump fluid end 22, wherein the reciprocating element bore 24 extends into pump fluid end 22 from an end (e.g., back end S2) of pump fluid end 22 and has a central axis 17; a suction valve assembly 56; and a discharge valve assembly 72. The suction valve assembly 56, the discharge valve assembly 72, or both the suction valve assembly 56 and the discharge valve assembly 72 comprise a valve assembly 20 of this disclosure comprising valve body 3; hardened insert 2, wherein the hardened insert is cylindrical and comprises a primary sealing surface 30A; sealing insert 13, wherein the sealing insert 13 is cylindrical and comprises an initial sealing surface 30B; and carrier 5 having an inside surface $S_i$, wherein the hardened insert 2 and the sealing insert 13 are coupled to the carrier 5, wherein, in a closed configuration of the valve assembly 20, the valve body 3 contacts the primary sealing surface 30A of the hardened insert 2 and the initial sealing surface 30B of the sealing insert 13 to prevent fluid flow through the valve assembly 20, and wherein, in an open configuration, the valve body 3 is separated from the primary sealing surface 30A of the hardened insert 2 and the initial sealing surface 30B of the sealing insert 13 to allow fluid flow through the valve assembly 20.

It will be appreciated that the wellbore servicing system 200 disclosed herein can be used for any purpose. In embodiments, the wellbore servicing system 200 may be used to service a wellbore 224 that penetrates a subterranean formation by pumping a wellbore servicing fluid into the wellbore and/or subterranean formation. As used herein, a "wellbore servicing fluid" or "servicing fluid" refers to a fluid used to drill, complete, work over, fracture, repair, or in any way prepare a well bore for the recovery of materials residing in a subterranean formation penetrated by the well bore. It is to be understood that "subterranean formation" encompasses both areas below exposed earth and areas below earth covered by water such as ocean or fresh water. Examples of servicing fluids suitable for use as the wellbore servicing fluid, the another wellbore servicing fluid, or both include, but are not limited to, cementitious fluids (e.g., cement slurries), drilling fluids or muds, spacer fluids, fracturing fluids or completion fluids, and gravel pack fluids, remedial fluids, perforating fluids, diverter fluids, sealants, drilling fluids, completion fluids, gelation fluids, polymeric fluids, aqueous fluids, oleaginous fluids, etc.

In embodiments, the wellbore servicing system 200 comprises one or more pumps 10 operable to perform oilfield and/or well servicing operations. Such operations may include, but are not limited to, drilling operations, fracturing operations, perforating operations, fluid loss operations, primary cementing operations, secondary or remedial cementing operations, or any combination of operations thereof. Although a wellbore servicing system is illustrated, skilled artisans will readily appreciate that the pump 10 disclosed herein may be employed in any suitable operation.

In embodiments, the wellbore servicing system 200 may be a system such as a fracturing spread for fracturing wells in a hydrocarbon-containing reservoir. In fracturing operations, wellbore servicing fluids, such as particle laden fluids, are pumped at high-pressure into a wellbore. The particle laden fluids may then be introduced into a portion of a subterranean formation at a sufficient pressure and velocity to cut a casing and/or create perforation tunnels and fractures within the subterranean formation. Proppants, such as grains of sand, are mixed with the wellbore servicing fluid to keep the fractures open so that hydrocarbons may be produced from the subterranean formation and flow into the wellbore. Hydraulic fracturing may desirably create high-conductivity fluid communication between the wellbore and the subterranean formation.

The wellbore servicing system 200 comprises a blender 202 that is coupled to a wellbore services manifold trailer 204 via flowline 206. As used herein, the term "wellbore services manifold trailer" includes a truck and/or trailer comprising one or more manifolds for receiving, organizing, and/or distributing wellbore servicing fluids during wellbore servicing operations. In this embodiment, the wellbore services manifold trailer 204 is coupled to six positive displacement pumps (e.g., such as pump 10 that may be mounted to a trailer and transported to the wellsite via a semi-tractor) via outlet flowlines 208 and inlet flowlines 210. In alternative embodiments, however, there may be more or less pumps used in a wellbore servicing operation. Outlet flowlines 208 are outlet lines from the wellbore services manifold trailer 204 that supply fluid to the pumps 10. Inlet flowlines 210 are inlet lines from the pumps 10 that supply fluid to the wellbore services manifold trailer 204.

The blender 202 mixes solid and fluid components to achieve a well-blended wellbore servicing fluid. As depicted, sand or proppant 212, water 214, and additives 216 are fed into the blender 202 via feedlines 218, 220, and 222, respectively. The water 214 may be potable, non-potable, untreated, partially treated, or treated water. In embodiments, the water 214 may be produced water that has been extracted from the wellbore while producing hydrocarbons form the wellbore. The produced water may comprise dissolved and/or entrained organic materials, salts, minerals, paraffins, aromatics, resins, asphaltenes, and/or other natural or synthetic constituents that are displaced from a hydrocarbon formation during the production of the hydrocarbons. In embodiments, the water 214 may be flowback water that has previously been introduced into the wellbore during wellbore servicing operation. The flowback water may comprise some hydrocarbons, gelling agents, friction reducers, surfactants and/or remnants of wellbore servicing fluids previously introduced into the wellbore during wellbore servicing operations.

The water 214 may further comprise local surface water contained in natural and/or manmade water features (such as ditches, ponds, rivers, lakes, oceans, etc.). Still further, the water 214 may comprise water stored in local or remote containers. The water 214 may be water that originated from near the wellbore and/or may be water that has been transported to an area near the wellbore from any distance. In some embodiments, the water 214 may comprise any combination of produced water, flowback water, local surface water, and/or container stored water. In some implementations, water may be substituted by nitrogen or carbon dioxide; some in a foaming condition.

In embodiments, the blender 202 may be an Advanced Dry Polymer (ADP) blender and the additives 216 are dry blended and dry fed into the blender 202. In alternative embodiments, however, additives may be pre-blended with water using other suitable blenders, such as, but not limited to, a GEL PRO blender, which is a commercially available preblender trailer from Halliburton Energy Services, Inc., to form a liquid gel concentrate that may be fed into the blender 202. The mixing conditions of the blender 202, including time period, agitation method, pressure, and temperature of the blender 202, may be chosen by one of ordinary skill in the art with the aid of this disclosure to produce a homogeneous blend having a desirable composition, density, and viscosity. In alternative embodiments, however, sand or proppant, water, and additives may be premixed and/or stored in a storage tank before entering a wellbore services manifold trailer 204.

In embodiments, the pump(s) 10 (e.g., pump(s) 10 and/or maintained pump(s) 10) pressurize the wellbore servicing fluid to a pressure suitable for delivery into a wellbore 224 or wellhead. For example, the pumps 10 may increase the pressure of the wellbore servicing fluid (e.g., the wellbore servicing fluid and/or the another wellbore servicing fluid) to a pressure of greater than or equal to about 3,000 psi, 5,000 psi, 10,000 psi, 20,000 psi, 30,000 psi, 40,000 psi, or 50,000 psi, or higher.

From the pumps 10, the wellbore servicing fluid may reenter the wellbore services manifold trailer 204 via inlet flowlines 210 and be combined so that the wellbore servicing fluid may have a total fluid flow rate that exits from the wellbore services manifold trailer 204 through flowline 226 to the flow connector wellbore 1128 of between about 1 BPM to about 200 BPM, alternatively from between about 50 BPM to about 150 BPM, alternatively about 100 BPM. In embodiments, each of one or more pumps 10 discharge wellbore servicing fluid at a fluid flow rate of between about 1 BPM to about 200 BPM, alternatively from between about 50 BPM to about 150 BPM, alternatively about 100 BPM. In embodiments, each of one or more pumps 10 discharge wellbore servicing fluid at a volumetric flow rate of greater than or equal to about 3, 10, or 20 barrels per minute (BPM), or in a range of from about 3 to about 20, from about 10 to about 20, or from about 5 to about 20 BPM.

Persons of ordinary skill in the art with the aid of this disclosure will appreciate that the flowlines described herein are piping that are connected together for example via flanges, collars, welds, etc. These flowlines may include various configurations of pipe tees, elbows, and the like. These flowlines connect together the various wellbore servicing fluid process equipment described herein.

Also disclosed herein are methods for servicing a wellbore (e.g., wellbore 224). Without limitation, servicing the wellbore may include: positioning the wellbore servicing composition in the wellbore 224 (e.g., via one or more pumps 10 as described herein) to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; to divert treatment fluids; and/or to seal an annulus between the wellbore and an expandable pipe or pipe string. In other embodiments, the wellbore servicing systems and methods may be employed in well completion operations such as primary and secondary cementing operation to isolate the subterranean formation from a different portion of the wellbore.

In embodiments, a wellbore servicing method may comprise transporting a positive displacement pump (e.g., pump 10) to a site for performing a servicing operation. Additionally or alternatively, one or more pumps may be situated on a suitable structural support. Non-limiting examples of a suitable structural support or supports include a trailer, truck, skid, barge or combinations thereof. In embodiments, a motor or other power source for a pump may be situated on a common structural support.

In embodiments, a wellbore servicing method may comprise providing a source for a wellbore servicing fluid. As described above, the wellbore servicing fluid may comprise any suitable fluid or combinations of fluid as may be appropriate based upon the servicing operation being performed. Non-limiting examples of suitable wellbore servicing fluid include a fracturing fluid (e.g., a particle laden fluid, as described herein), a perforating fluid, a cementitious fluid, a sealant, a remedial fluid, a drilling fluid (e.g., mud), a spacer fluid, a gelation fluid, a polymeric fluid, an aqueous fluid, an oleaginous fluid, an emulsion, various other wellbore servicing fluid as will be appreciated by one of skill in the art with the aid of this disclosure, and combinations thereof. The wellbore servicing fluid can comprise large particles selected from diverting agents, circulation loss materials, drill cuttings, or a combination thereof, for example, wherein the large particulates have a diameter of greater than or equal to about 0.07 inch (1.8 mm), 0.12 inch (3.0 mm), or 0.17 inch (4.3 mm). The wellbore servicing fluid may be prepared on-site (e.g., via the operation of one or more blenders) or, alternatively, transported to the site of the servicing operation.

In embodiments, a wellbore servicing method may comprise fluidly coupling a pump 10 to the wellbore servicing fluid source. As such, wellbore servicing fluid may be drawn into and emitted from the pump 10. Additionally or alternatively, a portion of a wellbore servicing fluid placed in a wellbore 224 may be recycled, i.e., mixed with the water stream obtained from a water source and treated in fluid treatment system. Furthermore, a wellbore servicing method may comprise conveying the wellbore servicing fluid from its source to the wellbore via the operation of the pump 10 disclosed herein.

In alternative embodiments, the reciprocating apparatus may comprise a compressor. In embodiments, a compressor similar to the pump 10 may comprise at least one each of a cylinder, plunger, connecting rod, crankshaft, and housing, and may be coupled to a motor. In embodiments, such a compressor may be similar in form to a pump and may be configured to compress a compressible fluid (e.g., a gas) and thereby increase the pressure of the compressible fluid. For example, a compressor may be configured to direct the discharge therefrom to a chamber or vessel that collects the compressible fluid from the discharge of the compressor until a predetermined pressure is built up in the chamber. Generally, a pressure sensing device may be arranged and configured to monitor the pressure as it builds up in the chamber and to interact with the compressor when a predetermined pressure is reached. At that point, the compressor may either be shut off, or alternatively the discharge may be directed to another chamber for continued operation.

In embodiments, a reciprocating apparatus comprises an internal combustion engine, hereinafter referred to as an engine. Such engines are also well known, and typically include at least one each of a plunger, cylinder, connecting rod, and crankshaft. The arrangement of these components is substantially the same in an engine and a pump (e.g. pump 10). A reciprocating element 18 such as a plunger may be similarly arranged to move in reciprocating fashion within the cylinder. Skilled artisans will appreciate that operation of an engine may somewhat differ from that of a pump. In a pump, rotational power is generally applied to a crankshaft acting on the plunger via the connecting rod, whereas in an engine, rotational power generally results from a force (e.g., an internal combustion) exerted on or against the plunger, which acts against the crankshaft via the connecting rod.

For example, in a typical 4-stroke engine, arbitrarily beginning with the exhaust stroke, the plunger is fully extended during the exhaust stroke, (e.g., minimizing the internal volume of the cylinder). The plunger may then be retracted by inertia or other forces of the engine componentry during the intake stroke. As the plunger retracts within the cylinder, the internal volume of cylinder increases, creating a low pressure within the cylinder into which an air/fuel mixture is drawn. When the plunger is fully retracted within the cylinder, the intake stroke is complete, and the cylinder is substantially filled with the air/fuel mixture. As the crankshaft continues to rotate, the plunger may then be extended, during the compression stroke, into the cylinder compressing the air-fuel mixture within the cylinder to a higher pressure.

A spark plug may be provided to ignite the fuel at a predetermined point in the compression stroke. This ignition increases the temperature and pressure within the cylinder substantially and rapidly. In a diesel engine, however, the spark plug may be omitted, as the heat of compression derived from the high compression ratios associated with diesel engines suffices to provide spontaneous combustion of the air-fuel mixture. In either case, the heat and pressure act forcibly against the plunger and cause it to retract back into the cylinder during the power cycle at a substantial force, which may then be exerted on the connecting rod, and thereby on to the crankshaft.

Those of ordinary skill in the art will readily appreciate various benefits that may be realized by the present disclosure. Conventional pump assemblies comprising pump valve seats experience high erosion rates which require frequent replacement. Valve seat replacement is a time consuming and labor intensive process. A long life valve seat of hardened material which resists erosion, such as ceramic or carbide, can be utilized; however, this can be cost prohibitive due to the material quantity required to form the complete conventional valve seat. Conventional valve seats are large, making them extremely expensive. Additionally, slurries with large particles create valve sealing issues making them difficult to pump. A valve assembly 20 as disclosed herein can be utilized to successfully pump these large particles, while minimizing an amount of hardened material needed for the seal, by employing a hardened insert 2 (e.g., a mini valve seat), which comprises a hardened material, such as carbide, coupled with a carrier 5, which can comprise a less hard material, such as steel. A sealing insert 13 of the herein disclosed valve assembly 20 is also coupled with the carrier 5. Sealing insert 13 can have a sealing lip 44 to provide wiping action as the valve assembly 20 closes. By coupling the sealing insert 13 and the hardened insert 2 with the carrier 5, conventional wear points are relocated to the more easily replaced valve body 3, thus reducing the amount (e.g., mass) of hardened material (e.g., carbide) needed for the seal by at least 10, 20, 30, 40, 50, or 60%. Sealing lip 44 can be operable to wipe the valve body sealing surface 30C during closing, and initiate the seal between the valve body sealing surface 30C and the sealing surface 30, creating a more efficient valve assembly 20 for pumping large particles.

The herein disclosed valve assembly 20 thus obviates the need for a conventional valve seat. The carrier 5 can serve as a housing (e.g., be an RVC 40, as descried hereinabove), can be integral to the fluid end 22 (e.g., can comprise the pump fluid end body 8) or can serve another function (e.g., can be a plunger 18 or piston).

By utilizing a hardened insert 2 and sealing insert 13 coupled with a carrier 5, a material of the hardened insert 2 can be disparate from a material of the carrier and the sealing insert 13 (i.e., a material of the primary sealing surface 30A provided by the hardened insert 2 can be disparate from a material of the carrier 5 and sealing insert 13). Accordingly, an amount of hardened material needed to provide sufficient sealing between the contact surface 30 provided by hardened insert 2 and sealing insert 13 and valve body sealing surface 30C of valve 3 is greatly reduced relative to a conventional valve seat, in which the initial sealing surface and the primary sealing surface are provided by a (large) valve seat. Utilizing a contact surface 30 provided with a hardened insert 2 that replaces or removes the need for a conventional valve seat thus allows for a reduction in an amount of hardened material needed to provide the sealing surface. The valve assembly 40 of this disclosure can thus increase a life of the valve assembly 20 relative to conventional valve assemblies and lower total component cost, thus providing decreased maintenance spend and decreased non-productive time on location. In embodiments, the hardened insert 2 can also serve as a retainer through added geometry (e.g., via extension or lip E, described hereinabove with reference to FIG. 9) for another component of the valve assembly 20, such as a valve spring 31.

A valve assembly 20 of this disclosure can thus be utilized to reduce cost of hardened materials by up to 60% or more, and moves the (e.g., steel) wear points to the easily replaced, consumable valve body 3. The wiping and sealing action provided by the sealing insert 13 can enable pumping of larger particles 71 in a slurry, such as large particulate diverting agents, circulation loss materials, drill cuttings, or other debris.

ADDITIONAL DISCLOSURE

The following are non-limiting, specific embodiments in accordance with the present disclosure:

In a first embodiment, a valve assembly comprises: a valve body; a hardened insert, wherein the hardened insert is cylindrical and comprises a primary sealing surface; a sealing insert, wherein the sealing insert is cylindrical and comprises an initial sealing surface; and a carrier having an inside surface, wherein the hardened insert and the sealing insert are coupled to the carrier, wherein, in a closed configuration of the valve assembly, the valve body contacts the primary sealing surface of the hardened insert and the initial sealing surface of the sealing insert to prevent fluid flow through the valve assembly, and wherein, in an open configuration, the valve body is separated from the primary sealing surface of the hardened insert and the initial sealing surface of the sealing insert to allow fluid flow through the valve assembly.

A second embodiment can include the valve assembly of the first embodiment, wherein the sealing insert is polymeric and/or elastomeric, and/or wherein a material of the hardened insert has a greater hardness than a material of the carrier, wherein the hardness is measured by the Vickers Hardness according to ASTM E92, the Rockwell or Vickers Hardness as measured by ASTM E18-19, and/or the Brinell Hardness as measured by ASTM E10-18.

A third embodiment can include the valve assembly of the second embodiment, wherein the material of the hardened insert comprises carbide and/or wherein the material of the carrier comprises steel (e.g., carburized steel).

A fourth embodiment can include the valve assembly of the third embodiment, wherein an amount of carbide in the hardened insert is at least 40, 50, or 60% less than an amount of carbide in a conventional valve seat wherein the primary sealing surface and the initial sealing surface are provided by a carbide valve seat.

A fifth embodiment can include the valve assembly of any one of the first to fourth embodiments, wherein the sealing insert further comprises an initial contact that first contacts the valve body when the valve assembly is closing, wherein the initial contact wipes the valve body during closing of the valve assembly.

A sixth embodiment can include the valve assembly of the fifth embodiment, wherein the initial contact comprises a lip of the sealing insert.

A seventh embodiment can include the valve assembly of any one of the first to sixth embodiments, wherein the carrier comprises a reciprocating element, a pump fluid end body of a pump fluid end, or a replaceable valve carrier (RVC).

An eighth embodiment can include the valve assembly of any one of the first to seventh embodiments, wherein the hardened insert and the sealing insert are coupled with the carrier about the inside surface thereof such that, in the open configuration, the sealing insert is axially closer to the valve body than the hardened insert along a central axis of the valve assembly.

A ninth embodiment can include the valve assembly of any one of the first to eighth embodiments, wherein the hardened insert and the sealing insert are coupled with the carrier such that the initial sealing surface and the primary sealing surface are adjacent and substantially continuous.

A tenth embodiment can include the valve assembly of any one of the first to ninth embodiments, wherein the valve body, the primary sealing surface, and/or the initial sealing surface are frusto-conical or frusto-spherical in shape.

An eleventh embodiment can include the valve assembly of any one of the first to tenth embodiments, wherein the valve assembly is a suction valve assembly or a discharge valve assembly.

A twelfth embodiment can include the valve assembly of any one of the first to eleventh embodiments, wherein the hardened insert further comprises an extension, wherein the extension extends a distance in a direction perpendicular to a central axis of the valve assembly, wherein the extension retains another component of the valve assembly.

A thirteenth embodiment can include the valve assembly of the twelfth embodiment, wherein the another component of the valve assembly comprises a valve spring.

In a fourteenth embodiment, a pump fluid end comprises: a reciprocating element at least partially within a reciprocating element bore of the pump fluid end, wherein the reciprocating element bore extends from a terminus thereof into the pump fluid end from an end of the pump fluid end and has a central axis; a suction valve assembly; and a discharge valve assembly, wherein the suction valve assembly, the discharge valve assembly, or both comprise a valve assembly comprising a valve body; a hardened insert; a sealing insert; and a carrier, wherein the hardened insert is cylindrical and comprises a primary sealing surface, wherein the sealing insert is cylindrical and comprises an initial sealing surface, wherein the carrier has an inside surface, wherein the hardened insert and the sealing insert are coupled to the carrier, and wherein, in a closed configuration of the valve assembly, the valve body contacts the primary sealing surface of the hardened insert and the initial sealing surface of the sealing insert to prevent fluid flow through the valve assembly, and wherein, in an open configuration, the valve body is separated from the primary sealing surface of the hardened insert and the initial sealing surface of the sealing insert to allow fluid flow through the valve assembly.

A fifteenth embodiment can include the pump fluid end of the fourteenth embodiment, wherein the discharge valve assembly comprises the valve assembly comprising the valve body; the hardened insert; the sealing insert; and the carrier.

A sixteenth embodiment can include the pump fluid end of the fourteenth or fifteenth embodiment, wherein the suction valve assembly comprises the valve assembly comprising the valve body; the hardened insert; the sealing insert; and the carrier.

A seventeenth embodiment can include the pump fluid end of any one of the fourteenth to sixteenth embodiments, wherein the valve assembly is horizontally positioned such that a central axis of the valve assembly is horizontal, or vertically positioned such that the central axis of the valve assembly is vertical.

An eighteenth embodiment can include the pump fluid end of any one of the fourteenth to seventeenth embodiments, wherein the pump fluid end is a concentric bore pump fluid end or a cross bore pump fluid end.

A nineteenth embodiment can include the pump fluid end of any one of the fourteenth to eighteenth embodiments, wherein the pump fluid end is a concentric bore pump fluid end, wherein the suction valve assembly comprises the valve assembly comprising the valve body; the hardened insert; the sealing insert; and the carrier, and wherein the carrier comprises the reciprocating element.

A twentieth embodiment can include the pump fluid end of any one of the fourteenth to eighteenth embodiments, further comprising a replaceable valve carrier (RVC), wherein the RVC is coupled with an inside surface of a pump fluid end body of the pump fluid end, wherein the carrier comprises the RVC, and wherein the hardened insert and the sealing insert are positioned about a cylindrical inside surface of the RVC.

A twenty first embodiment can include the pump fluid end of the twentieth embodiment, wherein a surface area of the inside surface of the RVC is at least 5, 10, or 15% larger than the combined area of the initial sealing surface and the primary sealing surface.

A twenty second embodiment can include the pump fluid end of any one of the fourteenth to eighteenth embodiments, wherein the carrier comprises a pump fluid end body of the pump fluid end, and wherein the hardened insert and the sealing insert are disposed about an inside surface of the pump fluid end body of the pump fluid end.

In a twenty third embodiment, a pump comprises the pump fluid end of any one of the fourteenth to twenty second embodiments, and a pump power end, wherein the pump power end is operable to reciprocate the reciprocating element within the reciprocating element bore of the pump fluid end.

In a twenty fourth embodiment, a method of servicing a wellbore comprises: fluidly coupling a pump to a source of a wellbore servicing fluid and to the wellbore; and communicating wellbore servicing fluid into a formation in fluid communication with the wellbore via the pump, wherein the pump comprises a pump fluid end and a pump power end, wherein the pump fluid end comprises: a reciprocating element at least partially within a reciprocating element bore of the pump fluid end, wherein the reciprocating element bore extends from a terminus thereof into the pump fluid end from an end of the pump fluid end and has a central axis; a suction valve assembly; and a discharge valve assembly, wherein the suction valve assembly, the discharge valve assembly, or both comprise a valve assembly comprising a valve body; a hardened insert; a sealing insert; and a carrier, wherein the hardened insert is cylindrical and comprises a primary sealing surface, wherein the sealing insert is cylindrical and comprises an initial sealing surface, wherein the carrier has an inside surface, wherein the hardened insert and the sealing insert are coupled to the carrier, and wherein, in a closed configuration of the valve assembly, the valve body contacts the primary sealing surface of the hardened insert and the initial sealing surface of the sealing insert to prevent fluid flow through the valve assembly, and wherein, in an open configuration, the valve body is separated from the primary sealing surface of the hardened insert and the initial sealing surface of the sealing insert to allow fluid flow through the valve assembly; and wherein the pump power end is operable to reciprocate the reciprocating element within the reciprocating element bore of the pump fluid end.

A twenty fifth embodiment can include the method of the twenty fourth embodiment, wherein the wellbore servicing fluid comprises a fracturing fluid, a cementitious fluid, a remedial fluid, a perforating fluid, a sealant, a drilling fluid, a spacer fluid, a completion fluid, a gravel pack fluid, a diverter fluid, a gelation fluid, a polymeric fluid, an aqueous fluid, an oleaginous fluid, or a combination thereof.

A twenty sixth embodiment can include he method of the twenty fourth or twenty fifth embodiment, wherein the wellbore servicing fluid comprises large particles selected from diverting agents, circulation loss materials, drill cuttings, or a combination thereof, wherein the large particulates have a diameter of greater than or equal to about 0.07 inch (1.8 mm), 0.12 inch (3.0 mm), or 0.17 inch (4.3 mm).

A twenty seventh embodiment can include the method of any one of the twenty fourth to twenty sixth embodiments, wherein the pump operates during the pumping of the wellbore servicing fluid at a pressure of greater than or equal to about 3,000 psi, 5,000 psi, 10,000 psi, 20,000 psi, 30,000 psi, 40,000 psi, or 50,000 psi.

A twenty eighth embodiment can include the method of any one of the twenty fourth to twenty seventh embodiments, wherein the pump operates during the pumping of the wellbore servicing fluid at a volumetric flow rate of greater than or equal to about 3, 10, or 20 barrels per minute (BPM), or in a range of from about 3 to about 20, from about 10 to about 20, or from about 5 to about 20 BPM.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

We claim:

1. A valve assembly comprising:
a valve body;
a hardened insert, wherein the hardened insert is cylindrical and comprises a primary sealing surface;
a sealing insert, wherein the sealing insert is cylindrical and comprises an initial sealing surface; and
a carrier having an inside surface,
wherein the hardened insert and the sealing insert are directly coupled to the carrier, wherein, in a closed configuration of the valve assembly, the valve body directly contacts the primary sealing surface of the hardened insert and the initial sealing surface of the sealing insert to prevent fluid flow through the valve assembly, and wherein, in an open configuration, the valve body is separated from the primary sealing surface of the hardened insert and the initial sealing surface of the sealing insert to allow fluid flow through the valve assembly.

2. The valve assembly of claim 1, wherein the sealing insert is polymeric and/or elastomeric, and/or wherein a material of the hardened insert has a greater hardness than a material of the carrier, wherein the hardness is measured by the Vickers Hardness according to ASTM E92, the Rockwell or Vickers Hardness as measured by ASTM E18-19, and/or the Brinell Hardness as measured by ASTM E10-18.

3. The valve assembly of claim 2, wherein the material of the hardened insert comprises carbide and/or wherein the material of the carrier comprises steel.

4. The valve assembly of claim 3, wherein an amount of carbide in the hardened insert is at least 40% less than an amount of carbide in a conventional valve seat wherein the primary sealing surface and the initial sealing surface are provided by a carbide valve seat.

5. The valve assembly of claim 1, wherein the sealing insert further comprises an initial contact that first contacts the valve body when the valve assembly is closing, wherein the initial contact wipes the valve body during closing of the valve assembly.

6. The valve assembly of claim 1, wherein the carrier comprises a reciprocating element, a pump fluid end body of a pump fluid end, or a replaceable valve carrier (RVC).

7. The valve assembly of claim 1, wherein the hardened insert and the sealing insert are coupled with the carrier about the inside surface thereof such that, in the open configuration, the sealing insert is axially closer to the valve body than the hardened insert along a central axis of the valve assembly.

8. The valve assembly of claim 1, wherein the hardened insert and the sealing insert are coupled with the carrier such that the initial sealing surface and the primary sealing surface are adjacent and substantially continuous.

9. The valve assembly of claim 1, wherein the valve body, the primary sealing surface, and/or the initial sealing surface are frusto-conical or frusto-spherical in shape.

10. The valve assembly of claim 1, wherein the valve assembly is a suction valve assembly or a discharge valve assembly.

11. The valve assembly of claim 1, wherein the hardened insert further comprises an extension, wherein the extension extends a distance in a direction perpendicular to a central axis of the valve assembly, wherein the extension retains another component of the valve assembly.

12. A pump fluid end comprising:
a reciprocating element at least partially within a reciprocating element bore of the pump fluid end, wherein the reciprocating element bore extends from a terminus thereof into the pump fluid end from an end of the pump fluid end and has a central axis;
a suction valve assembly; and
a discharge valve assembly,
wherein the suction valve assembly, the discharge valve assembly, or both comprise a valve assembly comprising a valve body; a hardened insert; a sealing insert; and a carrier, wherein the hardened insert is cylindrical and comprises a primary sealing surface, wherein the sealing insert is cylindrical and comprises an initial sealing surface, wherein the carrier has an inside surface, wherein the hardened insert and the sealing insert are directly coupled to the carrier, and wherein, in a closed configuration of the valve assembly, the valve body directly contacts the primary sealing surface of the hardened insert and the initial sealing surface of the sealing insert to prevent fluid flow through the valve assembly, and wherein, in an open configuration, the valve body is separated from the primary sealing surface of the hardened insert and the initial sealing surface of the sealing insert to allow fluid flow through the valve assembly.

13. The pump fluid end of claim 12:
wherein the discharge valve assembly comprises the valve assembly comprising the valve body; the hardened insert; the sealing insert; and the carrier; or
wherein the suction valve assembly comprises the valve assembly comprising the valve body; the hardened insert; the sealing insert; and the carrier; or
both the suction valve assembly and the discharge valve assembly comprise the valve assembly comprising the valve body; the hardened insert; the sealing insert; and the carrier.

14. The pump fluid end of claim 12, wherein the pump fluid end is a concentric bore pump fluid end or a cross bore pump fluid end.

15. The pump fluid end of claim 12, wherein the pump fluid end is a concentric bore pump fluid end, wherein the suction valve assembly comprises the valve assembly comprising the valve body; the hardened insert; the sealing insert; and the carrier, and wherein the carrier comprises the reciprocating element.

16. The pump fluid end of claim 12 further comprising a replaceable valve carrier (RVC), wherein the RVC is coupled with an inside surface of a pump fluid end body of the pump fluid end, wherein the carrier comprises the RVC, and wherein the hardened insert and the sealing insert are positioned about a cylindrical inside surface of the RVC.

17. The pump fluid end of claim 12, wherein the carrier comprises a pump fluid end body of the pump fluid end, and wherein the hardened insert and the sealing insert are disposed about an inside surface of the pump fluid end body of the pump fluid end.

18. A method of servicing a wellbore, the method comprising:
fluidly coupling a pump to a source of a wellbore servicing fluid and to the wellbore; and
communicating wellbore servicing fluid into a formation in fluid communication with the wellbore via the pump, wherein the pump comprises a pump fluid end and a pump power end,
wherein the pump fluid end comprises:
a reciprocating element at least partially within a reciprocating element bore of the pump fluid end, wherein the reciprocating element bore extends from a terminus thereof into the pump fluid end from an end of the pump fluid end and has a central axis;
a suction valve assembly; and
a discharge valve assembly,
wherein the suction valve assembly, the discharge valve assembly, or both comprise a valve assembly comprising a valve body; a hardened insert; a sealing insert; and a carrier, wherein the hardened insert is cylindrical and comprises a primary sealing surface, wherein the sealing insert is cylindrical and comprises an initial sealing surface, wherein the carrier has an inside surface, wherein the hardened insert and the sealing insert are directly coupled to the carrier, and wherein, in a closed configuration of the valve assembly, the valve body directly contacts the primary sealing surface of the hardened insert and the initial sealing surface of the sealing insert to prevent fluid flow through the valve assembly, and wherein, in an open configuration, the valve body is separated from the primary sealing surface of the hardened insert and the initial sealing surface of the sealing insert to allow fluid flow through the valve assembly; and
wherein the pump power end is operable to reciprocate the reciprocating element within the reciprocating element bore of the pump fluid end.

19. The method of claim 18, wherein the wellbore servicing fluid comprises a fracturing fluid, a cementitious fluid, a remedial fluid, a perforating fluid, a sealant, a drilling fluid, a spacer fluid, a completion fluid, a gravel pack fluid, a diverter fluid, a gelation fluid, a polymeric fluid, an aqueous fluid, an oleaginous fluid, or a combination thereof.

20. The method of claim 18, wherein the pump operates during the communicating of the wellbore servicing fluid at a pressure of greater than or equal to about 3,000 psi.

* * * * *